(12) United States Patent
Koike et al.

(10) Patent No.: US 7,468,942 B2
(45) Date of Patent: Dec. 23, 2008

(54) OPTICAL PICKUP, OPTICAL ELEMENT, AND INFORMATION REPRODUCING APPARATUS CONFIGURED FOR USE WITH ANY OF PLURAL TYPES OF RECORDING MEDIA

(75) Inventors: Katsuhiro Koike, Tsurugashima (JP); Koichi Maruyama, Tokyo (JP); Shuichi Takeuchi, Saitama (JP)

(73) Assignees: Pioneer Corporation, Tokyo-to (JP); Hoya Corporation, Tokyo (JP)

( * ) Notice: Subject to any disclaimer, the term of this patent is extended or adjusted under 35 U.S.C. 154(b) by 589 days.

(21) Appl. No.: 10/840,479

(22) Filed: May 7, 2004

(65) Prior Publication Data

US 2004/0223442 A1 Nov. 11, 2004

(30) Foreign Application Priority Data

May 9, 2003 (JP) ............... P2003-131262
Jan. 20, 2004 (JP) ............... P2004-012270

(51) Int. Cl.
*G11B 7/135* (2006.01)
(52) U.S. Cl. .................... 369/112.07; 359/569
(58) Field of Classification Search ............ 369/112.08, 369/112.07; 359/569; G11B 7/135; G02B 5/18
See application file for complete search history.

(56) References Cited

U.S. PATENT DOCUMENTS

| 6,118,594 | A | | 9/2000 | Maruyama | |
|---|---|---|---|---|---|
| 6,134,055 | A | * | 10/2000 | Koike | 359/724 |
| 6,449,095 | B1 | * | 9/2002 | Ohtaki et al. | 359/566 |
| 6,775,064 | B2 | * | 8/2004 | Maruyama | 359/569 |
| 7,031,076 | B2 | * | 4/2006 | Kimura et al. | 359/719 |
| 2001/0008513 | A1 | | 7/2001 | Arai et al. | |

FOREIGN PATENT DOCUMENTS

| JP | 2000-081566 | 3/2000 |
|---|---|---|
| JP | 2000-260056 | 9/2000 |
| JP | 2001-195769 | 7/2001 |

* cited by examiner

*Primary Examiner*—Aristotelis M Psitos
(74) *Attorney, Agent, or Firm*—Drinker Biddle & Reath LLP

(57) ABSTRACT

An optical pickup has a light source for emitting a plurality of laser beams with different wavelengths; and an objective lens for focusing the laser beams emitted from the light source on recording surfaces of plural types of information recording media. A diffractive lens structure is provided in a light path of the laser beam, the structure including ring zone areas divided by a plurality of phase steps for correcting a wavefront aberration of the laser beam, a diameter of an outermost phase step of the diffractive lens structure is smaller than a second largest effective diameter of effective diameters required for reproduction of the plural types of information recording media.

19 Claims, 24 Drawing Sheets

DURING REPRODUCING
FIRST OPTICAL DISC

DURING REPRODUCING
SECOND OPTICAL DISC

WAVEFRONT ABERRATION SHAPE FOR CD
BEFORE SPHERICAL ABERRATION CORRECTED

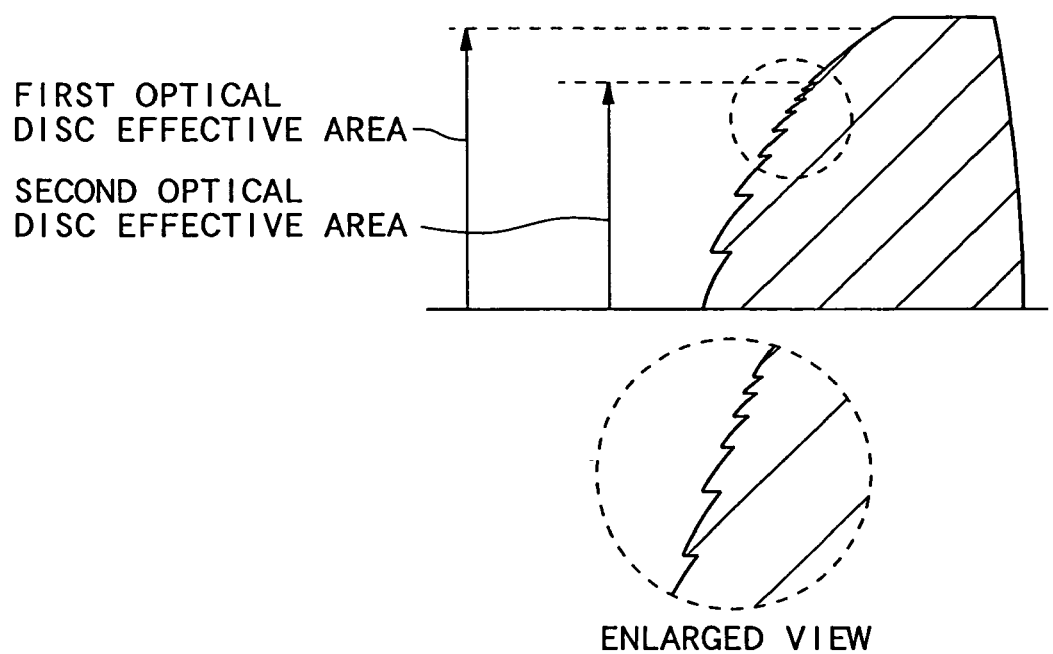

$H_{CD} = 1.5$
$H_{DVD} = 2.0$ $H_1 = 0.382$
$H_2 = 0.552$
$H_3 = 0.692$
$H_4 = 0.822$
$H_5 = 0.955$
$H_6 = 1.110$

ASPHERIC SURFACE APEX

DVD WAVEFRONT ABERRATION
(ACTUAL WAVEFRONT ABERRATION)

CD WAVEFRONT ABERRATION
(ACTUAL WAVEFRONT ABERRATION)

CD SPOT SHAPE (WHOLE)

CD SPOT SHAPE (SIDE LOBE)

$H_{CD} = 1.5$
$H_{DVD} = 2.0$ $H_1 = 0.382$
$H_2 = 0.552$
$H_3 = 0.692$
$H_4 = 0.822$
$H_5 = 0.955$ $H_{Blu-ray} = 1.50$
$H_{DVD} = 1.13$ $H_1 = 0.210$
$H_2 = 0.299$
$H_3 = 0.369$
$H_4 = 0.430$
$H_5 = 0.484$
$H_6 = 0.536$
$H_7 = 0.584$
$H_8 = 0.632$
$H_9 = 0.678$
$H_{10} = 0.725$
$H_{11} = 0.773$
$H_{12} = 0.824$
$H_{13} = 0.881$
$H_{14} = 0.953$

BLU-RAY DISC LONGITUDINAL SPHERICAL ABERRATION

DVD LONGITUDINAL SPHERICAL ABERRATION

BLU-RAY DISC WAVEFRONT ABERRATION (PHASE FUNCTION METHOD)

DVD WAVEFRONT ABERRATION (PHASE FUNCTION METHOD)

BLU-RAY DISC WAVEFRONT ABERRATION
(ACTUAL WAVEFRONT ABERRATION)

DVD WAVEFRONT ABERRATION
(ACTUAL WAVEFRONT ABERRATION)

DVD SPOT SHAPE (WHOLE)

DVD SPOT SHAPE (SIDE LOBE)

OPTICAL PICKUP, OPTICAL ELEMENT, AND INFORMATION REPRODUCING APPARATUS CONFIGURED FOR USE WITH ANY OF PLURAL TYPES OF RECORDING MEDIA

BACKGROUND OF THE INVENTION

1. Field of the Invention

The present invention relates to an optical pickup, an optical element used in same, and an information reproducing apparatus including same.

2. Related Art

There is known in the related art a compatible information reproducing (recording) apparatus that can reproduce (record) optical discs with different standards such as CD, DVD. This compatible information reproducing (recording) apparatus need store produce (record) the optical disc for each standard by focusing a laser beam with a specified wavelength to a required spot diameter on the recording surface of the optical disc.

The protective layer on the optical disc may have different thickness for each standard. For the protective layer with different thickness, the movement of the objective lens to adjust the focal point of the laser beam is insufficient to remove the spherical aberration and is incapable of focusing the laser beam to the required spot diameter, making it difficult to reproduce (record) the information.

To correct this spherical aberration, the conventional compatible information reproducing (recording) apparatus includes a diffractive lens structure formed over at least the whole of an area of a smaller effective diameter of effective diameters of the objective lens included in the optical pickup which are necessary for the reproduction of plural types of information recording media (see, for example, Japanese application patent laid-open publication No. 2000-81566).

The related art as described above has following problems.

The die material generally has a higher thermal expansion coefficient than the lens material. The die will thus contract more than the lens when they are cooled after molding, thereby making it difficult to release the lens. The lens made from resin may cause destruction of the lens surface fine structures or cause deformation of the lens when it is released, thereby increasing the aberration. The lens made from glass may destroy the die.

The diffractive structure provided on the lens has narrower distances between the phase steps at the outer periphery of the lens. This may decrease the diffraction efficiency at the lens periphery due to the edge shadow of the steps. Particularly, in the inner common area in which the diffractive lens structure is provided, the slight variation of the wavelength used may vary the aberration as well as the image point position. The outer area intended for the reproduction of the high-density optical disc thus also needs the diffractive structure to prevent the discontinuous wavefront between the inner area and the outer area. This may decrease significantly the use efficiency of the light beam for the high-density disc.

The problems to be solved by the present invention include the above-described problem by way of an example.

SUMMARY OF THE INVENTION

It is therefore an object of the present invention to provide an optical pickup, an optical element and an information reproducing apparatus which can provide a diffractive lens shape for easily releasing from the die, prevent the distances between phase steps at the outer periphery from decreasing in the common area, and rarely provide the discontinuous wavefront between the inner area and the outer area, even without the diffractive structure in the area intended for the high-density disc.

The above object of the present invention can be achieved by an optical pickup provided with: a light source for emitting a plurality of laser beams with different wavelengths; and an objective lens for focusing the laser beams emitted from the light source on recording surfaces of plural types of information recording media, wherein a diffractive lens structure is provided in a light path of the laser beam, the structure including ring zone areas divided by a plurality of phase steps for correcting a wavefront aberration of the laser beam, a diameter of an outermost phase step of the diffractive lens structure is smaller than a second largest effective diameter of effective diameters required for reproduction of the plural types of information recording media.

According to the present invention, the diameter of the outermost phase step of the diffractive lens structure is smaller than the second largest effective diameter of effective diameters required for reproduction of the plural types of information recording media. This may thus help prevent the objective lens from being fastened on the die during cooling, thereby facilitating releasing.

In one aspect of the optical pickup of the present invention, a focused point of a reproducing laser beam which passes through the diffractive lens structure during reproducing at least one of those of the plural types of information recording media that are other than an information recording medium requiring a largest effective diameter for reproduction, resides between (i) a position at which an optical axis meets the laser beam passing through a height corresponding to an effective diameter required for reproduction of the information recording media, and (ii) a position at which the optical axis meets the laser beam passing through an innermost of an area outside the outermost phase step.

In another aspect of the optical pickup of the present invention, a width of a non-diffractive area which is outside the outermost phase step and within a second large effective diameter of the plurality of effective diameters is wider than distances between a plurality of phase steps included in the diffractive lens structure.

In further aspect of the optical pickup of the present invention, the diffractive lens structure includes a plurality of phase steps which have a distance between them that decreases and then increases at higher heights from a vicinity of an optical axis.

In further aspect of the optical pickup of the present invention, an rms value W of a wavefront aberration during reproducing at least one of information recording media meets, $0.05\lambda$ rms$<W<0.13\lambda$ rms.

In further aspect of the optical pickup of the present invention, the diffractive lens structure includes obtuse angles on edges of phase steps between a plurality of ring zones.

In further aspect of the optical pickup of the present invention, the diffractive lens structure is formed on a lens surface of the objective lens.

In further aspect of the optical pickup of the present invention, the diffractive lens structure is formed on a surface of a lens different from the objective lens.

In further aspect of the optical pickup of the present invention, the light source emits a laser beam with a wavelength at least in a vicinity of 407 nm.

In still further aspect of the optical pickup of the present invention, the light source further emits a laser beam with a wavelength in a vicinity of 650 nm.

The above object of the present invention can be achieved by an optical element for correcting a wavefront aberration generated during focusing a plurality of laser beams with different wavelengths through an objective lens on recording surfaces of plural types of information recording media, provided with a diffractive lens structure including ring zone areas divided by a plurality of phase steps, wherein a diameter of an outermost phase step of the diffractive lens structure is smaller than a second largest effective diameter of effective diameters required for reproduction of the plural types of information recording media.

In one aspect of the optical element of the present invention, a focused point of a reproducing laser beam which passes through the diffractive lens structure during reproducing at least one of those of the plural types of information recording media that are other than an information recording medium requiring a largest effective diameter for reproduction, resides between (i) a position at which an optical axis meets the laser beam passing through a height corresponding to an effective diameter required for reproduction of the information recording media, and (ii) a position at which the optical axis meets the laser beam passing through an innermost of an area outside the outermost phase step.

In another aspect of the optical element of the present invention, a width of a non-diffractive area which is outside the outermost phase step and within a second large effective diameter of the plurality of effective diameters is wider than distances between a plurality of phase steps included in the diffractive lens structure.

In further aspect of the optical element of the present invention, the diffractive lens structure includes a plurality of phase steps which have a distance between them that decreases and then increases at higher heights from a vicinity of an optical axis.

In further aspect of the optical element of the present invention, an rms value W of a wavefront aberration during reproducing at least one of information recording media meets, $0.05\lambda$ rms$<$W$<0.13\lambda$ rms.

In further aspect of the optical element of the present invention, the diffractive lens structure includes obtuse angles on edges of phase steps between a plurality of ring zones.

In further aspect of the optical element of the present invention, the optical element comprises an integrated objective lens element.

In further aspect of the optical element of the present invention, the diffractive lens structure is formed on a plate lens substrate.

In further aspect of the optical element of the present invention, the optical element corrects the wavefront aberration with respect to a laser beam with a wavelength at least in a vicinity of 407 nm.

In still further aspect of the optical element of the present invention, the optical element further corrects the wavefront aberration with respect to a laser beam with a wavelength in a vicinity of 650 nm.

The above object of the present invention can be achieved by an information reproducing apparatus for reproducing a plurality of information recording media to be reproduced by a plurality of laser beams with different wavelengths, provided with above optical pickup.

BRIEF DESCRIPTION OF THE DRAWINGS

In the accompanying drawings:

FIG. 12 shows an illustrative view of the diffractive lens structure of a conventional objective lens;

DETAILED DESCRIPTION OF THE PREFERRED EMBODIMENTS

This embodiment is an embodiment where the present invention is applied to a compatible information reproducing (recording) apparatus which can reproduce (record) two types of optical discs having one optical disc (hereinafter referred to as the first optical disc) and another optical disc (hereinafter referred to as the second optical disc) with a smaller effective diameter needed for reproduction than the above-described optical disc.

The information reproducing (recording) apparatus, an optical pickup for use in the apparatus, and an optical element will be described in detail below.

(1) Information Reproducing (Recording) Apparatus

The information reproducing (recording) apparatus will first be described with reference to FIG. 1.

(1-1) Structure of Information Reproducing (Recording) Apparatus

Figure 1:
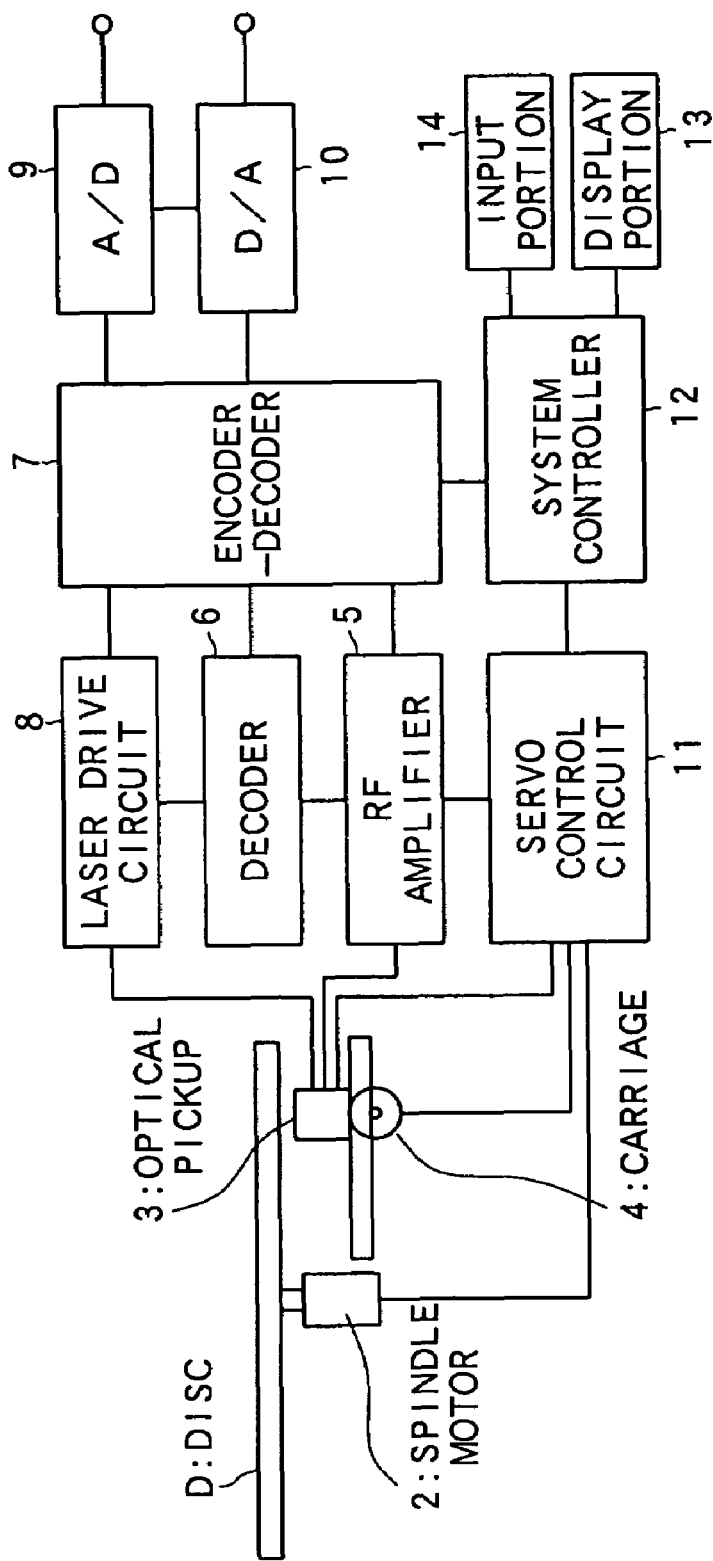
FIG. 1 shows a schematic diagram of the configuration of an information reproducing (recording) apparatus according to an embodiment.

FIG. 1 shows a schematic diagram of the configuration of the information reproducing (recording) apparatus.

As shown in FIG. 1, the information reproducing (recording) apparatus 1 is configured to include a spindle motor 2, an optical pickup 3, a carriage 4, an RF (radio frequency) amplifier 5, a decoder 6, an encoder-decoder 7, a laser drive circuit 8, an A/D converter 9, a D/A converter 10, a servo control circuit 11, a system controller 12, an input portion 13, and a display portion 14. The structure of the optical pickup 3 will be described in detail below.

(1-2) Operation of Information Reproducing (Recording) Apparatus

The operation of the information reproducing (recording) apparatus 1 will now be described.

At first, the spindle motor 2 rotates the optical disc D. The carriage 4 moves the optical pickup 3 radially of the optical disc D up to the predetermined readout position.

The optical pickup 3 then projects a laser beam onto the optical disc D and receives a reflected light beam for the projected light beam from the optical disc D to produce an RF (radio frequency) signal corresponding to the received strength. The RF amplifier 5 amplifies this RF signal to a predetermined level.

The decoder 6 then detects a wobbling frequency from the amplified RF signal to detect the position at which the laser beam is projected onto the optical disc 2. Also from the amplified RF signal, the encoder-decoder 7 extracts and demodulates a modulated signal that corresponds to the information recorded on the optical disc D. The encoder-decoder 7 also outputs a modulated signal corresponding to the information to be recorded and which is externally input.

Based on this modulated signal, the laser drive circuit 8 then outputs a control signal to control the laser beam strength of the laser diode as described below.

The A/D converter 9 converts to a digital data the analog information signal that is information to be recorded and which is externally input during recording information. The D/A converter 10 converts to an analog information signal the digital data that is demodulated by the encoder-decoder 7 when reproducing information.

The servo controller circuit 11 servo controls the actuators of the spindle motor 2, carriage 4, and optical pickup 3, during recording or reproducing information. The system controller 12 controls the whole optical disc player 1. To do this, the input portion 13 provides externally to the system controller 12 predetermined operation instructions, and the display portion 14 displays necessary information such as information reproducing status.

The above-described information reproducing (recording) apparatus 1 can reproduce (record) information precisely, because the apparatus includes an optical element with a diffractive lens structure to form the optical pickup 3, and the optical element can form an excellent laser beam wavefront for the second optical disc and first optical disc.

(2) Optical Pickup

The optical pickup 3 for use in the information reproducing (recording) apparatus 1 will now be described with reference to FIGS. 2 and 3.

(2-1) First Optical Pickup (2-1-1) Structure of First Optical Pickup

Figure 2:
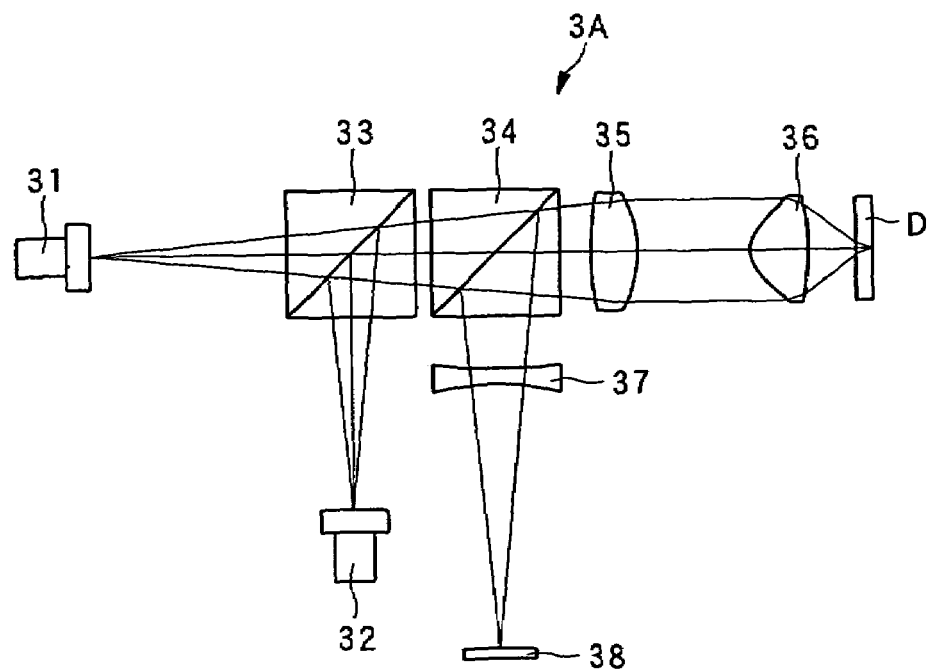
FIG. 2 shows a schematic diagram of the configuration of the first optical pickup according to an embodiment.

FIG. 2 shows a schematic diagram of the configuration of the first optical pickup 3A.

As shown in FIG. 2, the first optical pickup 3A is configured to include the first laser diode 31 which projects a laser beam (hereinafter referred to as the first laser beam) for use to reproduce the first optical disc, the second laser diode 32 which projects a laser beam (hereinafter referred to as the second laser beam) for use to reproduce the second optical disc, a beam splitter 33 which transmits the first laser beam emitted from the first laser diode 31 and reflects the second laser beam emitted from the second laser diode 32, a beam splitter 34 which transmits the laser beams emitted from the first laser diode 31 and the second laser diode 32 and reflects the laser beam reflected back from the disc, a collimator lens 35, an objective lens 36 with a diffractive lens structure, a sensor lens 37, and a detector 38.

(2-1-2) Operation of Optical Pickup

The operation of the optical pickup 3A will now be described.

The first laser diode 31 or the second laser diode 32 projects a laser beam depending on the optical disc inserted in the information reproducing (recording) apparatus 1. Specifically, the first optical disc inserted will allow the first laser diode 31 to project the first laser beam. The second optical disc inserted will allow the second laser diode 32 to project the second laser beam.

When the first laser diode 31 projecting the laser beam, the beam splitter 33 and the beam splitter 34 will transmit the laser beam to lead it to the collimator lens 35. When the second laser diode 32 projecting the laser beam, the beam splitter 33 will reflect the laser beam and then the beam splitter 34 will transmit the laser beam to lead it to the collimator lens 35.

The collimator lens 35 then converts the laser beam to a parallel beam before providing it to the objective lens 36. The objective lens 36 then adjusts the wavefront of the laser beam and focuses the wavefront-adjusted laser beam onto the recording surface of the optical disc with a good wavefront.

The objective lens 36 and the collimator lens 35 then transmit the reflected laser beam, which is modulated and reflected by information bits on the recording surface of the optical disc. The beam splitter 34 then reflects the reflected laser beam to lead it to the detector 38 through the sensor lens 37.

The detector 38 then receives the reflected laser beam and produces a signal corresponding to the received beam strength.

(2-2) Second Optical Pickup (2-2-1) Structure of Second Optical Pickup

Figure 3:
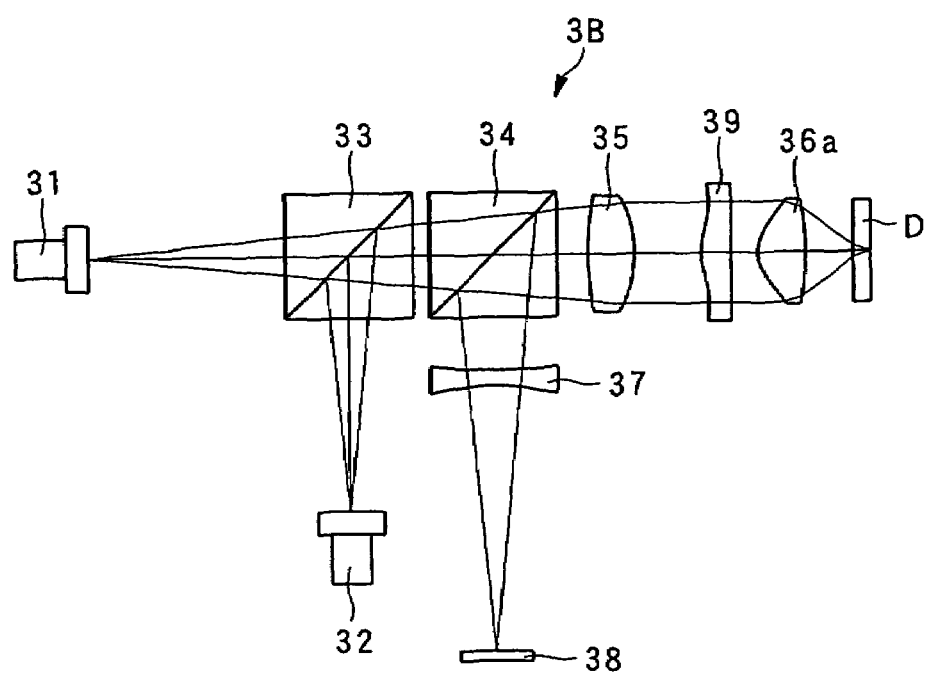
FIG. 3 shows a schematic diagram of the configuration of the second optical pickup according to an embodiment.

FIG. 3 shows a schematic diagram of the configuration of the second optical pickup 3B.

As shown in FIG. 3, the second optical pickup 3B is configured to include, as in the first optical pickup 3A, the first laser diode 31, the second laser diode 32, a beam splitter 33, a beam splitter 34, a collimator lens 35, an objective lens 36 a, a sensor lens 37, and a detector 38. The second optical pickup 3B also includes an optical lens 39 with a diffractive lens structure. The objective lens 36a does not include the diffractive lens structure unlike the objective lens 36 of the first optical pickup 3A.

(2-2-2) Operation of Optical Pickup

The operation of the optical pickup 3B will now be described.

The optical pickup 3B operates almost the same as the optical pickup 3A described above. The description of the same part is thus omitted and a description of the different part will only be made below.

As described above, the optical pickup 3B includes the optical lens 39 between the collimator lens 35 and the objective lens 36a. The collimator lens 35 thus provides to the optical lens 39 the laser beam that is converted to a parallel beam. The optical lens 39 then adjusts the wavefront of the laser beam before providing it to the objective lens 36a. The objective lens 36a focuses the wavefront-adjusted laser beam onto the recording surface of the optical disc with a good wavefront.

The objective lens 36a and the collimator lens 35 then transmit the reflected laser beam, which is modulated and reflected by information bits on the recording surface of the optical disc. The beam splitter 34 then reflects the reflected laser beam to lead it to the detector 38 through the sensor lens 37.

The detector 38 then receives the reflected laser beam and produces a signal corresponding to the received beam strength.

The above-described optical pickups 3A and 3B adjust the wavefront of the laser beam with the objective lens 36 or the optical lens 39 with a diffractive lens structure as discussed below. The first laser beam and the second laser beam can thus be focused on the recording surface of the optical disc with a good wavefront.

(3) Optical Element with Diffractive Lens Structure

The optical element with a diffractive lens structure for use in the optical pickup 3 will be described with reference to figures. This embodiment will describe the objective lens 36 with a diffractive lens structure, and the optical lens 39 with a diffractive lens structure.

(3-1) Objective Lens with Diffractive Lens Structure

The objective lens 36 with a diffractive lens structure will be described first.

Figure 4:
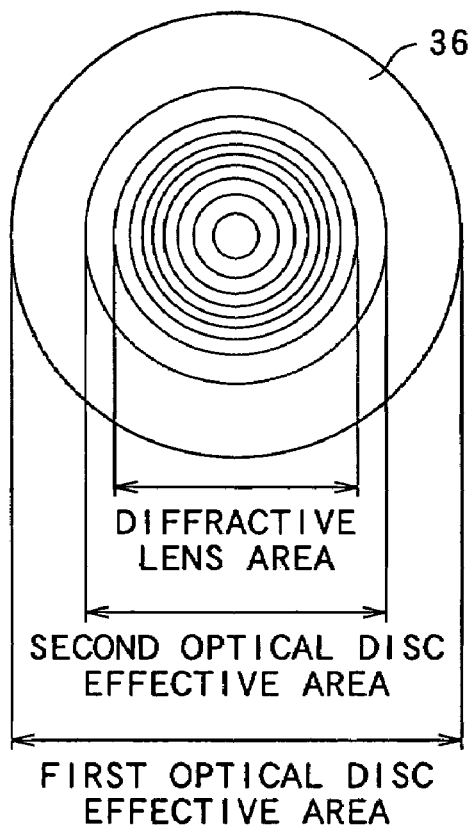
FIG. 4 shows a plan view of an objective lens with a diffractive lens structure according to an embodiment.
Figure 5:
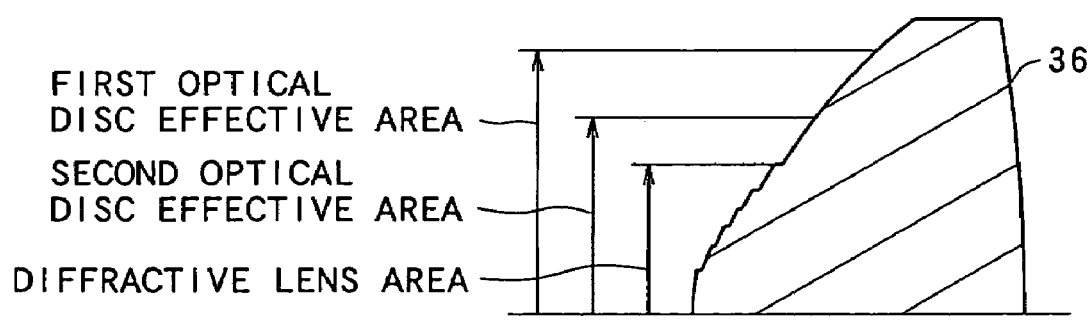
FIG. 5 shows a cross-sectional view of an objective lens with a diffractive lens structure according to an embodiment.

FIG. 4 shows a plan view of the objective lens 36 with a diffractive lens structure. FIG. 5 shows a cross-sectional view of the same objective lens 36.

As shown in FIGS. 4 and 5, the objective lens 36 is formed on the basis of an aspherical lens for focusing the laser beam onto the first optical disc with a good wavefront. The objective lens 36 includes the diffractive lens structure formed within that area on the aspherical lens that is within the effective diameter of the second optical disc. This diffractive lens structure is formed in a shape to focus the laser beam onto the first optical disc and the second optical disc with a good wavefront.

As described above, the objective lens 36 includes the first optical disc effective area within which the second optical disc effective area resides within which the diffractive lens area resides. Specifically, the second optical disc effective area in the objective lens 36 includes the inner diffractive lens area and a non-diffractive lens area outside the diffractive lens area.

Figure 6A:
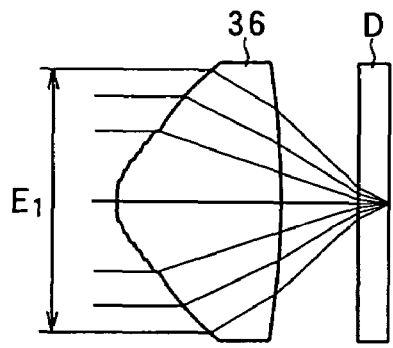
FIG. 6A shows an illustrative view of an effective diameter of the first optical disc.
Figure 6B:
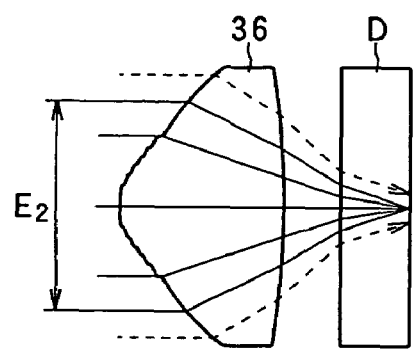
FIG. 6B shows an illustrative view of an effective diameter of the second optical disc.

The effective diameter refers here to the height at which that of a bundle of light beams necessary for information reproduction (recording) of the optical disc that is farthest from the optical axis passes through. For example, as shown in FIG. 6, the reproduction of the first optical disc needs a light beam bundle within the effective diameter E1 for the first optical disc (refer to FIG. 6A.) The reproduction of the second optical disc needs a light beam bundle within the effective diameter E2 for the second optical disc (refer to FIG. 6B.) The reproduction of the second optical disc will not need the light beam outside the effective diameter E2 for the second optical disc, so that the light beam may not focus on the focal point, as shown in FIG. 6B as a dashed line.

In the description below, the effective diameter for the first optical disc is referred to as the first optical disc effective diameter, the area within this first effective diameter the first optical disc effective area, similarly the effective diameter for the second optical disc the second optical disc effective diameter, and the area within this second effective diameter the second optical disc effective area. The area of the diffractive lens structure is referred to as the diffractive lens area. The effective diameter of the diffractive lens area is defined as the diameter of the outermost phase step of a plurality of phase steps that form the diffractive lens structure. The area outside the outermost phase step, which does not have the diffractive lens structure, is referred to as the non-diffractive lens area. The non-diffractive lens area within the second optical disc effective area is referred to as the second optical disc non-diffractive lens area.

The diffractive lens structure will be described in detail below.

(3-1-1) Wavefront Aberration to be Corrected by Diffractive Lens Structure.

The wavefront aberration to be corrected by the diffractive lens structure will be described before describing the diffractive lens structure.

Figure 7:
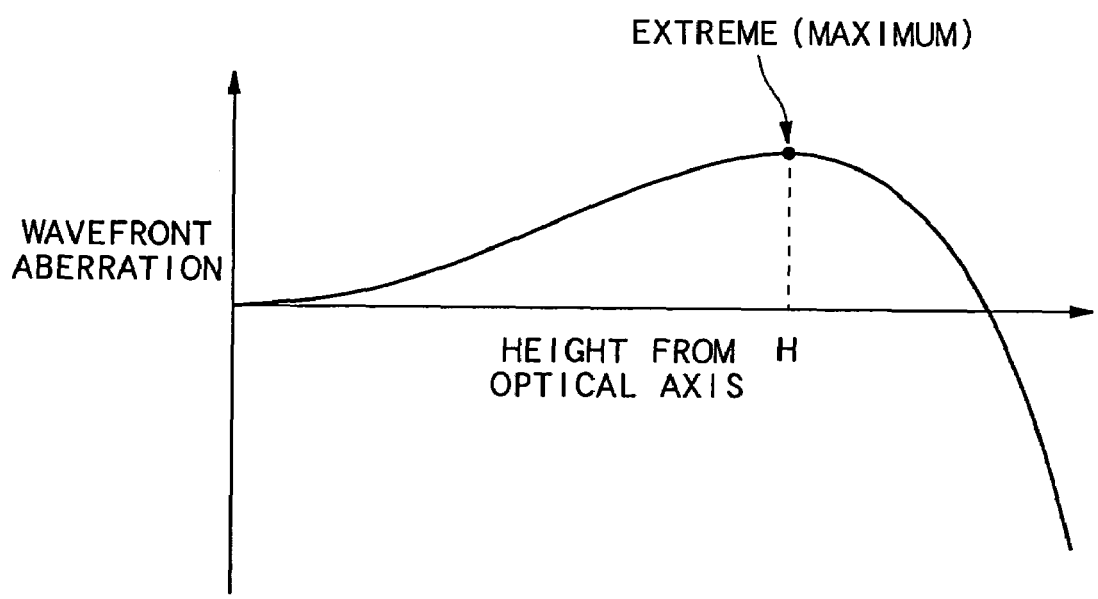
FIG. 7 shows a wavefront aberration curve to be corrected by the diffractive lens structure according to an embodiment.

A well-known objective lens formed of the aspherical lens for focusing the laser beam onto the first optical disc with a good wavefront (specifically, an objective lens without any diffractive lens structure) may focus the laser beam onto the second optical disc with the wavefront aberration occurring due to the different thicknesses of the protective layer between both optical discs. This wavefront aberration is in a form that has the dominant component of the height from the optical axis raised to the forth power plus a component of the height squared which results from the image-surface position. Assuming that the component of the height squared resulting from the image-surface position has the opposite sign to the component of the height raised to the forth power and that the image-surface is set to provide a predetermined amount of the component of the height squared, the curve representing the wavefront aberration (wavefront aberration curve) is a curve which has the extreme (maximum) within the effective area, as shown in FIG. 7. The position at which the extreme occurs has a height H from the optical axis that depends on the image-surface position. Specifically, the variation of the image-surface position can adjust the height H at which the extreme occurs.

This embodiment forms the diffractive lens structure on the objective lens 36 to correct the above-described wavefront aberration. The configuration of the diffractive lens structure will be described below.

(3-1-2) Image Surface Position

The image-surface position will first be described with reference to FIG. 8.

Figure 8:
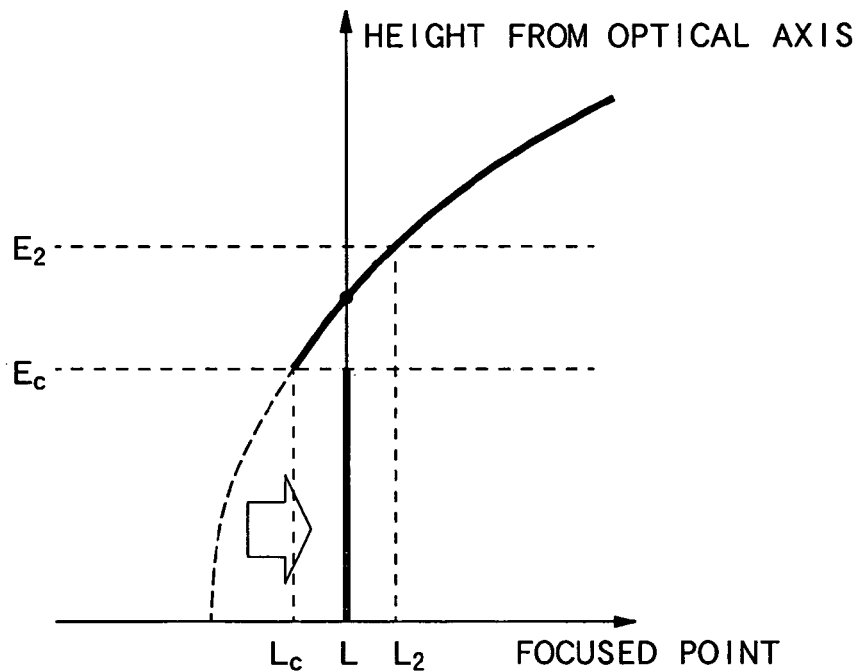
FIG. 8 shows a longitudinal spherical aberration curve for the second optical disc of the objective lens according to an embodiment.

FIG. 8 shows a longitudinal spherical aberration curve for the second optical disc. The longitudinal spherical aberration curve plots against the height from the optical axis (vertical axis) the focused point of the light beam passing through the height (horizontal axis). In FIG. 8, the solid line represents the longitudinal spherical aberration curve after correction by the diffractive lens structure. The dashed line represents the longitudinal spherical aberration curve before correction by the diffractive lens structure.

As shown in FIG. 8, the image-surface position L for the second optical disc is set between $L_2$ and $L_c$: $L_2$ is the focused point of the light beam which passes through the second optical disc effective diameter $E_2$, and $L_c$ is the focused point of the light beam which passes through the innermost $E_c$ in the second optical disc non-diffractive lens area. The image-surface position L is usually the focused point of the light beam that passes through the second optical disc diffractive lens area.

The operation and effect of the image-surface position set as described above will be described below with reference to FIG. 9.

Figure 9:
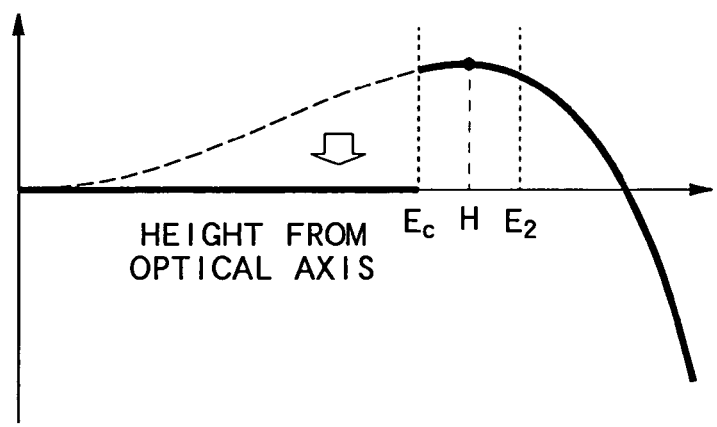
FIG. 9 shows a wavefront aberration curve for the second optical disc of the objective lens according to an embodiment.

FIG. 9 shows a wavefront aberration curve for the second optical disc with the image-surface position set as described above. The wavefront aberration curve plots against the height from the optical axis (vertical axis) the wavefront aberration of the light beam passing through the height (horizontal axis). In FIG. 9, the solid line represents the wavefront aberration curve after correction by the diffractive lens structure. The dashed line represents the wavefront aberration curve before correction by the diffractive lens structure.

As shown in FIG. 9, the image-surface position set as described above can allow the wavefront aberration to have the extreme (maximum) at a height H that is located between the second optical disc effective diameter E2 and the innermost Ec in the second optical disc non-diffractive lens area. Specifically, the wavefront aberration can have the extreme (maximum) at a height H that is located in the second optical disc non-diffractive lens area.

The area around the extreme in the wavefront aberration curve is here an area with a small slope where little change occurs in the wavefront aberration. This area where little change occurs in the wavefront aberration can thus be located in the second optical disc non-diffractive lens area to focus the laser beam passing through the non-diffractive lens area with a good wavefront without any correction by the diffractive lens structure.

(3-1-3) Diffractive Lens Structure

The diffractive lens structure will now be described below.

The diffractive lens structure is formed in a shape to focus the laser beam with a good wavefront onto two types of optical discs with different standards: the first optical disc with a larger effective diameter needed for reproduction, and the second optical disc with a smaller effective diameter needed for reproduction.

One of the design techniques for the diffractive lens structure is the phase function method. The phase function method can correct the aberration by assuming an infinitely thin phase object in a surface that forms the diffractive lens structure and by optimizing the phase distribution of the phase object. Specifically, the method is a technique that designs the shape of the diffractive lens structure by optimizing the phase function $\phi$ defined in the following equation (where $\lambda_o$: design wavelength, $d_n$: phase coefficient, and h: diffraction grating height) by adjusting the phase coefficient $d_n$.

[Equation (1)]

$$\phi(h) = \frac{1}{\lambda_o} \sum_{i=1} d_{2i} \cdot h^{2i}$$

To analyze the light beam passing through the diffractive lens structure, the phase function method adds to the light beam passing through the phase object represented by the above phase function φ a light path of dor×λ×φ (dor is the diffraction order of the light beam diffracted by the diffractive lens structure and λ is the wavelength of the light beam passing through the phase object).

In the actual procedure for designing the diffractive lens structure, the phase coefficient $d_n$ is first adjusted to identify the phase function φ for focusing the laser beam with a good wavefront onto two types of optical discs with different standards.

Figure 10:
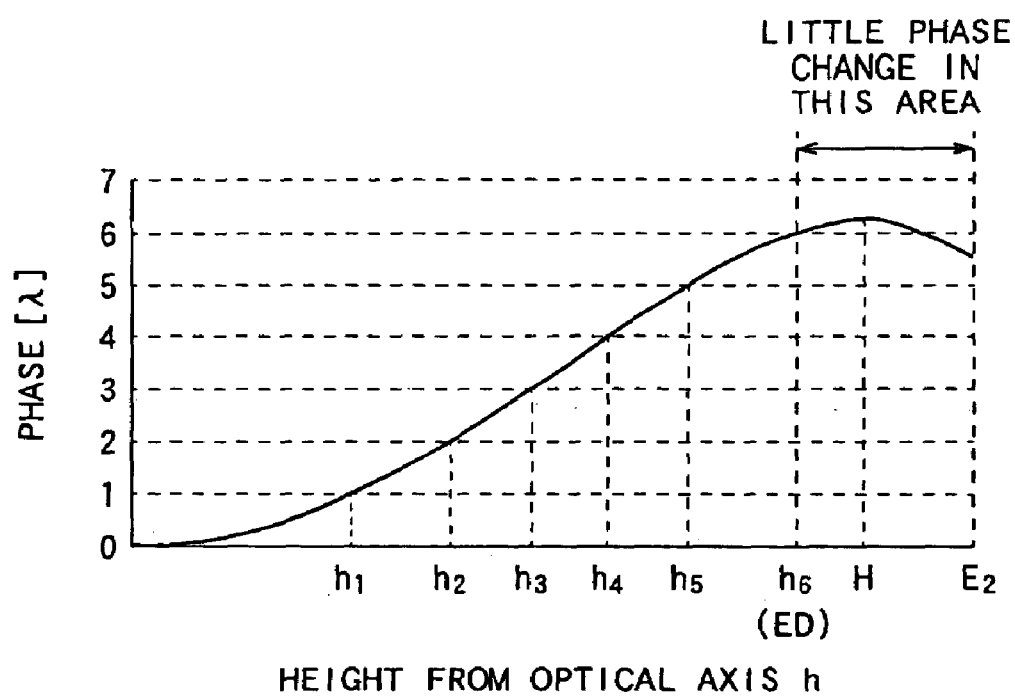
FIG. 10 shows a phase function curve needed for the diffractive lens structure according to an embodiment.

FIG. 10 shows the phase function φ as identified above. As described above, the wavefront aberration curve can have the maximum that is located in the second optical disc non-diffractive lens area. The phase function curve can thus also have the maximum in the second optical disc non-diffractive lens area and can monotonously increase to the maximum.

From the phase function φ, heights are then determined at which the phase is an integral multiple, and the phase structure is provided at the heights to design the diffractive lens structure. That is, as shown in FIG. 10, the phase steps may be formed at the heights of $h_1$, $h_2$, $h_3$, $h_4$, $h_5$, and $h_6$ at which the phase function φ is marked off every integral multiple phase. It is understood, from such a determination of the phase steps of the diffractive lens structure, that the phase function with a steeper slope provides a narrower distance between phase steps. The phase function as shown in FIG. 10 has a slope that increases at farther positions from the optical axis, and achieves the maximum slope on the way, and then decreases, and achieves the zero slope at the height H. In other words, the distance between the phase steps of the diffractive lens structure determined from the phase function in FIG. 10 decreases at higher heights from the vicinity of the optical axis, and increases again on the way. The phase function shown in FIG. 10 also passes through the phase amount of 6 after decreasing gradually from the height H to the height $E_2$. A phase step was conventionally formed even at this height. The present invention may adequately and intentionally eliminate the phase step required in the vicinity of the maximum of the phase function. This can provide a wider width of the second optical disc non-diffractive area and a narrower diffractive lens area, although some aberration remains. The adequate elimination of the phase step required in the vicinity of the maximum of the phase function as described above can provide an enlarged width of the second optical disc non-diffractive area, which is wider than any distance between the phase steps of the diffractive structure.

The phase step amount can be optimized for a design diffraction order to increase the diffraction efficiency at the diffraction order. For example, for the design diffraction order of 1, the phase step may be set to provide a light path difference at the phase steps that corresponds to one wavelength. For the design diffraction order of 1 for both the first optical disc and the second optical disc, the phase step may be set to provide a light path difference that corresponds to the wavelength of either laser beam. Alternatively, the phase step may be set to provide a light path difference that corresponds to the average of the wavelengths of both laser beams.

When the diffractive lens is used for a plurality of wavelengths, it may be impossible to provide, for each wavelength, a phase step amount that is exactly an integral multiple of the wavelength. The phase function method can calculate a wavefront aberration that only includes the design diffraction order components. The actual wavefront aberration, when the phase step amount deviates from an integral multiple of the wavelength, may include the lens wavefront aberration analyzed by the phase function method plus a sawtooth-waveform wavefront aberration due to the deviation of the phase step amount. Conventional design of the diffractive lens for use at a plurality of wavelengths selects the design diffraction order in such a way that the light path difference is, for each wavelengths, near an integral multiple of the wavelength, thereby providing a sufficiently-small sawtooth-waveform remaining aberration for each wavelength. Such a setting of the design diffraction order, however, may need many phase steps. The sawtooth-waveform wavefront aberration due to the deviation of the phase step amount may cause an extra diffracted-light beam, which may provide some loss of light intensity. The wavefront aberration, however, will have little impact on the spot shape, unlike the ordinary spherical aberration. That is, depending on the combination of the wavelengths or the aberration to be corrected, the sawtooth-waveform wavefront aberration can intentionally be accepted to decrease the number of the phase steps, thereby providing a diffractive structure that is desirable in terms of production. Conventional lens design attempts to provide an aberration of 0.05λ or less for a single lens. The lens according to the present invention, which has the sawtooth-wave form wavefront aberration, however, can provide a good spot even with the aberration more than 0.05λ.

An increased sawtooth-waveform wavefront aberration, however, may decrease the strehl ratio although it may cause no deterioration in the spot shape. The sawtooth-waveform wavefront aberration more than 0.13λ rms will provide a strehl ratio of 50% or less. The strehl ratio is the ratio of the top value of the spot intensity focused by an aplanatic lens and the top value of the spot intensity focused by the actual lens. Specifically, the decrease of the strehl ratio means the decrease of the use efficiency of the light beam. To ensure 50% or more of the use efficiency of the light beam and to reduce the impact from the diffracted light beam other than those with the design diffraction order, the saw tooth-waveform remaining aberration may preferably be less than 0.13λ rms.

The outermost phase step, i.e., the phase step at the interface between the diffractive lens area and the non-diffractive lens area, may be formed to provide a light path difference that is generally an integral multiple of one wavelength as described above. Specifically, the outermost phase step may be formed to provide a light path difference that corresponds to one wavelength or a light path difference that corresponds to two wavelengths.

Figure 11B:
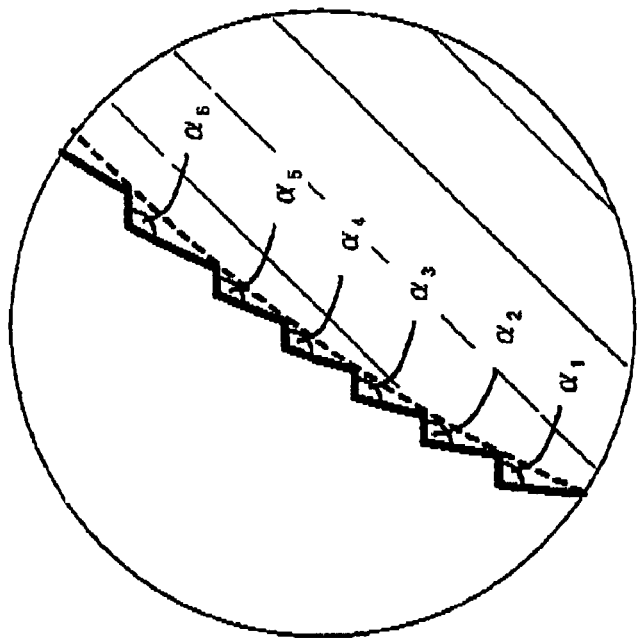
FIG. 11B shows an enlarged cross-sectional view of the diffractive lens structure.
Figure 11A:
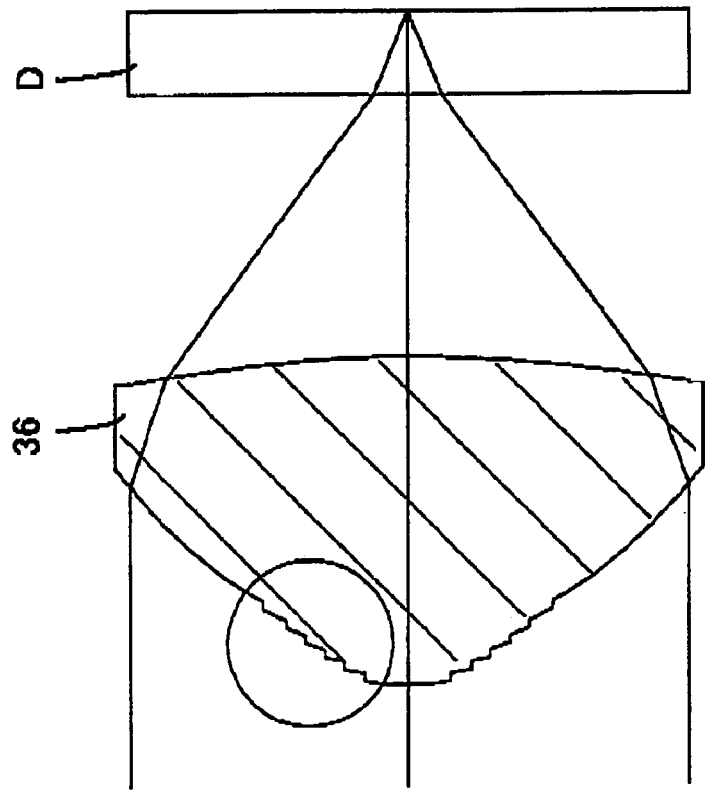
FIG. 11A shows a cross-sectional view of an objective lens on which the diffractive lens structure according to an embodiment is formed.

FIG. 11A shows a cross-sectional view of the objective lens 36 on which such diffractive lens structure is formed as is determined as described above with the design diffraction order of 1 for both the first optical disc and the second optical disc. FIG. 11B shows an enlarged cross-sectional view of the diffractive lens structure on the objective lens 36. The phase function curve monotonously increases in the diffractive lens area as described above. Therefore, as shown in FIGS. 11A and 11B, the diffractive lens structure is formed in such a way that ring zones divided by each phase step are blazed to make their thicknesses increase radially outward on the lens than a macroscopic aspheric surface in the surface on which the diffractive structure is formed. The diffractive lens structure is also formed to have the phase steps in such a way that the thickness of the objective lens 36 decreases at the heights of $h_1$ to $h_6$ at which the phase is marked off integral multiple phase. The dashed line in FIG. 11B represents the macroscopic aspheric surface in the surface on which the diffractive structure is formed.

The operation and effect of the diffractive lens structure as formed above will be described below The objective lens 36 may be manufactured by filling hot resin or glass into a die, cooling the die, and releasing a molded resin or glass product (objective lens 36) from the die.

For the purpose of comparison, the conventional objective lens with a diffractive lens structure will first be described below. The conventional objective lens included the diffractive lens structure formed over at least the whole of the second optical disc effective area. The conventional objective lens also included the phase steps between the ring zones in such a way that the outer one of the ring zones divided by the adjacent phase steps can reside outside in the lens thickness direction (see FIG. 12). The conventional lens thus included acute angles on the edges of the phase steps between the ring zones. The conventional objective lens included many ring zones at the outer periphery of the lens. The expansion coefficient difference between the die and the lens during the lens formation as described above then fastened the molded product (objective lens) on the die. This made it difficult to release the product, thereby reducing the productivity, and also dropped the lens edges during releasing, thereby reducing the lens performance. The dropped edges remained on the die to reduce the lifetime of the die. The lens formed from the glass broke the die, thereby further reducing the lifetime of the die.

In contrast, the objective lens 36 according the present embodiment includes the diffractive lens structure formed in the inner area within the second optical disc effective area. The objective lens 36 also includes the phase steps between the ring zones in such a way that the outer one of the ring zones divided by the adjacent phase steps can reside inside in the lens thickness direction. As shown in FIG. 11B, the objective lens 36 thus includes obtuse angles $\alpha_1, \alpha_2, \alpha_3, \alpha_4, \alpha_5$, and $\alpha_6$ on the edges of the phase steps between the ring zones. The objective lens 36 includes fewer phase steps at the outer periphery of the lens. This may thus help prevent the objective lens 36 from being fastened on the die during cooling, thereby facilitating releasing. The lens edge rarely drops during releasing, thereby improving the lens performance and increase the lifetime of the die. The lens formed from the glass will not break the die, thereby further increasing the lifetime of the die. Fewer phase steps at the outer periphery of the lens can prevent the decrease of the diffraction efficiency due to the effect of the edge shadow of the step. Problems can also be solved of the discontinuous wavefront between the diffractive area and the non-diffractive area due to the slight variation of the wavelength used.

The objective lens 36 with the diffractive lens structure as described above can correct, for the second optical disc, the wavefront aberration of the laser beam passing through the diffractive lens area using the diffractive lens structure. The objective lens 36 does not correct but can acceptably decrease the wavefront aberration of the laser beam passing through the non-diffractive lens area. As a whole, the laser beam can be focused with a good wavefront. The objective lens 36 can also correct, for the first optical disc, the wavefront aberration of the laser beam passing through the diffractive lens area using the diffractive lens structure. The objective lens 36 can also correct the wavefront aberration of the laser beam passing through the non-diffractive lens area using the aspherical lens shape. As a whole, the laser beam can be focused with a good wavefront. That is, the objective lens 36 can focus the laser beam with a good wavefront on both the second optical disc and the first optical disc.

(3-2) Optical Lens with Diffractive Lens Structure

The optical lens 39 with a diffractive lens structure will now be described below. The optical lens 39 is a lens different from the objective lens 36 with the above-described diffractive lens structure formed thereon.

Figure 13:
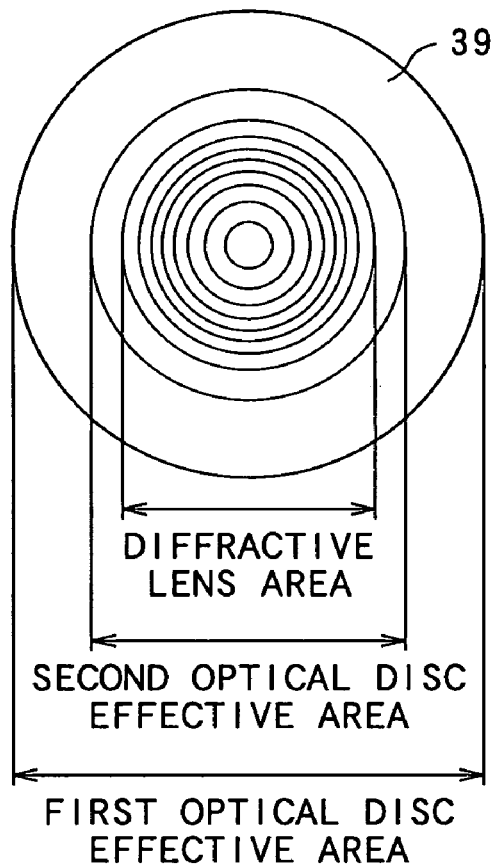
FIG. 13 shows a plan view of an optical lens with the diffractive lens structure according to an embodiment.
Figure 14:
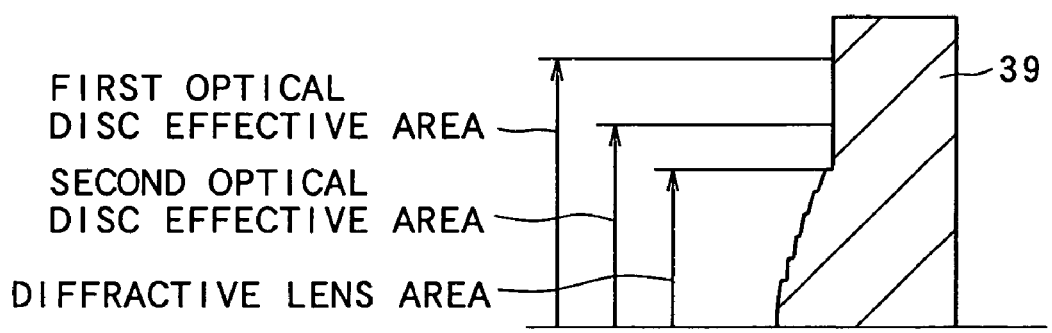
FIG. 14 shows a cross-sectional view of an optical lens with the diffractive lens structure according to an embodiment.

FIG. 13 shows a plan view of the optical lens 39 with the diffractive lens structure. FIG. 14 shows a cross-sectional view of the same optical lens 39.

As shown in FIGS. 13 and 14, the optical lens 39 includes the diffractive lens structure in the inner area within the second optical disc effective area of the optical lens 39. This diffractive lens structure is formed to focus, on the recording surfaces of both the first optical disc and the second optical disc, the corresponding laser beam with a good wavefront.

The combined apparatus of the optical lens 39 and the objective lens 36a will have the same image-surface position and the same shape of the diffractive lens structure as for the objective lens 36 as described above. A detailed description is thus omitted here.

(4) Modified Example

The above-described embodiments describe the objective lens 36 or the optical lens 39 including the diffractive lens structure formed on its first surface. The objective lens 36 or the optical lens 39, however, may also include the diffractive lens structure formed on its second surface.

The above-described embodiments also describe the information reproducing (recording) apparatus that can reproduce (record) two types of optical discs of the first optical disc and the second optical disc, the optical pickup for use in the apparatus, and the optical element. The present invention, however, can also apply to an information reproducing (recording) apparatus that can reproduce (record) more than two types of optical discs, an optical pickup for use in the apparatus, and an optical element.

Figure 15A:
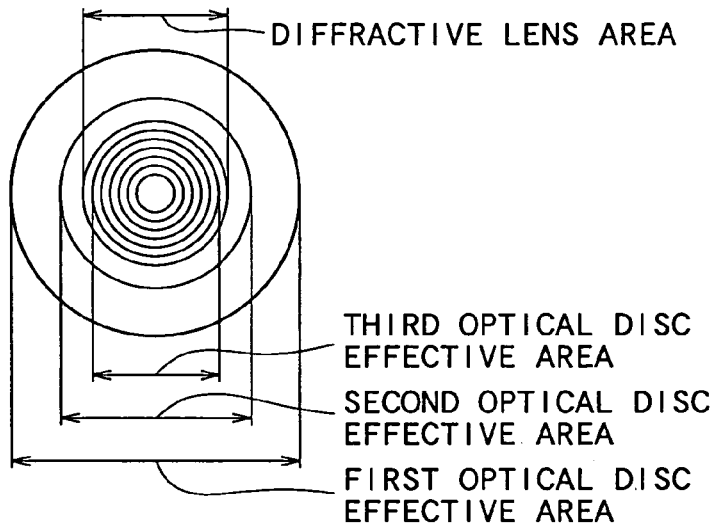
FIGS. 15A to 15C show illustrative views of the diffractive lens structure area according to a modified example of an embodiment.
Figure 15B:
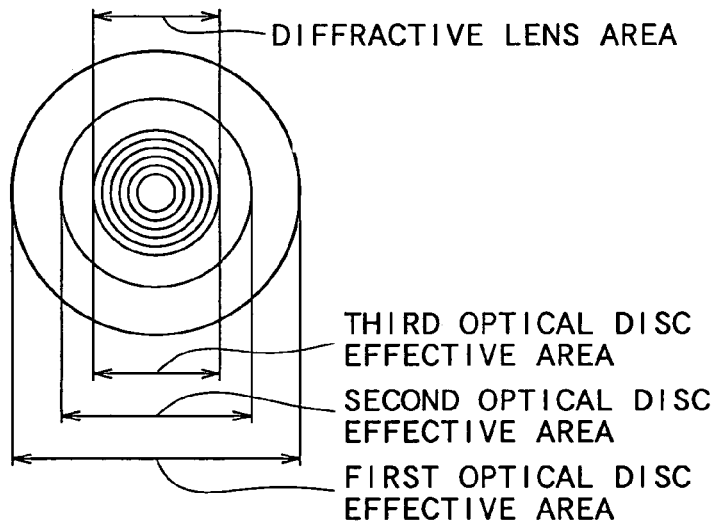
Figure 15C:
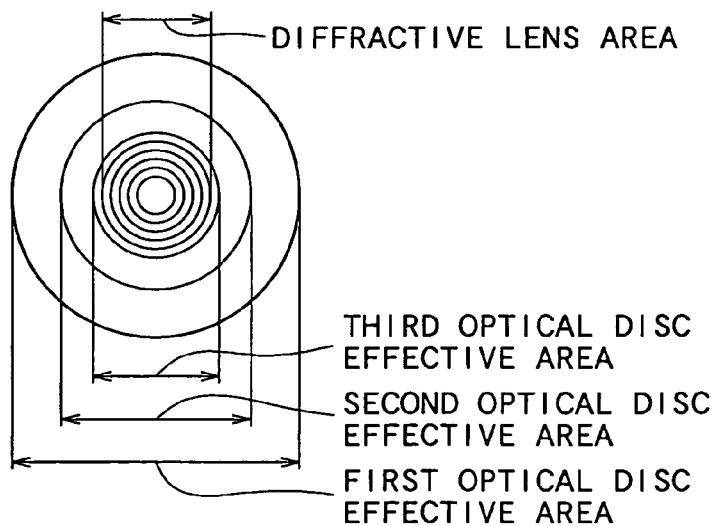

In this case, the diffractive lens structure in the optical element is formed in an area inside the second largest effective diameter of the effective diameters required for each optical disc. For, example, an optical element corresponding to three types of the optical discs may include the following cases: (i) the diffractive lens structure is formed in such a way that the outermost of the diffractive lens structure resides between an effective area (the second disc effective area) that corresponds to the second optical disc which needs the second largest effective diameter, and another effective area (the third disc effective area) that corresponds to the third optical disc which needs the third largest effective diameter (FIG. 15A); (ii) the diffractive lens structure is formed in the same area as the third optical disc effective area (FIG. 15B); and (iii) the diffractive lens structure is formed inside the third optical disc effective area (FIG. 15C).

In this case, the image surface position and the diffractive lens structure may be determined by meeting the conditions for the first optical disc and the second optical disc in the above-described embodiment.

The present invention is not limited to the embodiments described above and various changes and modifications can be made without departing from the scope of the invention as defined in the appended claims.

EXAMPLES (1) Example 1

This example 1 relates to an objective lens with a diffractive lens structure for use in the DVD/CD compatible reproducing (recording) apparatus.

The Table 1 summarizes the design conditions (focal point length, lens numerical aperture, laser beam wavelength, and design diffraction order) for the DVD and CD.

According to the design conditions described above, the phase function is specified for correcting the wavefront aberration of the laser beam for the DVD and CD. The table 2 summarizes the phase coefficients $d_n$ for the phase function defined by the above-described equation (1).

The heights h are determined at which the phase function is marked off every integral multiple phase. The phase step is then set to provide a light path difference that corresponds to one wavelength (650 nm) at each height to design the diffractive lens structure. The table 3 summarizes the design values (diameter of step and light path difference) of the diffractive lens structure.

Figure 16A:
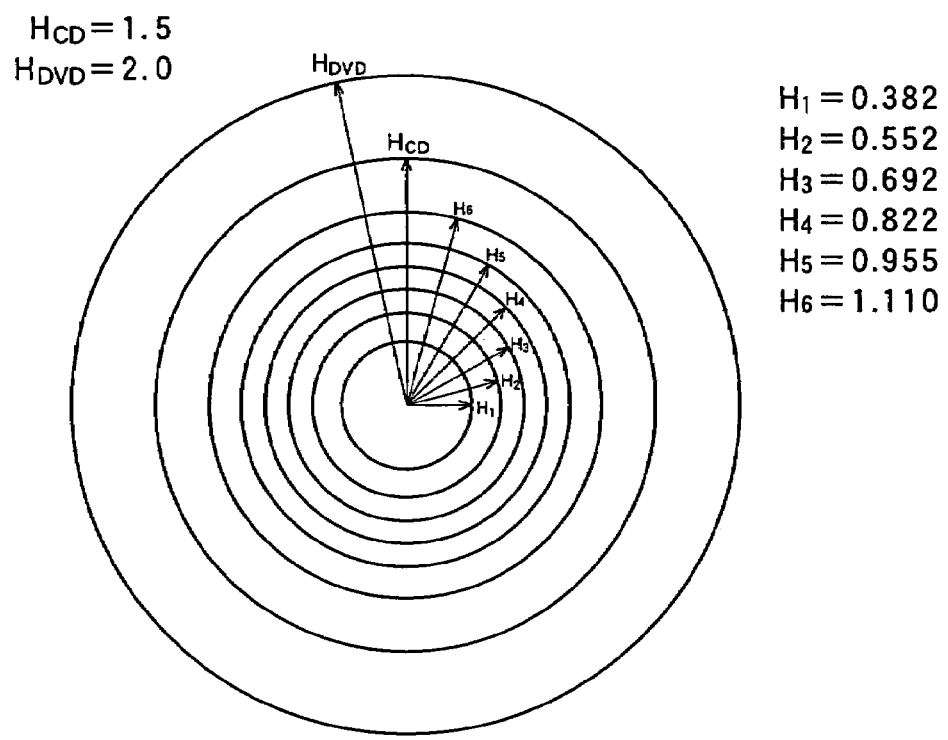
FIG. 16A shows a plan view of the objective lens according to the first embodiment.
Figure 16B:
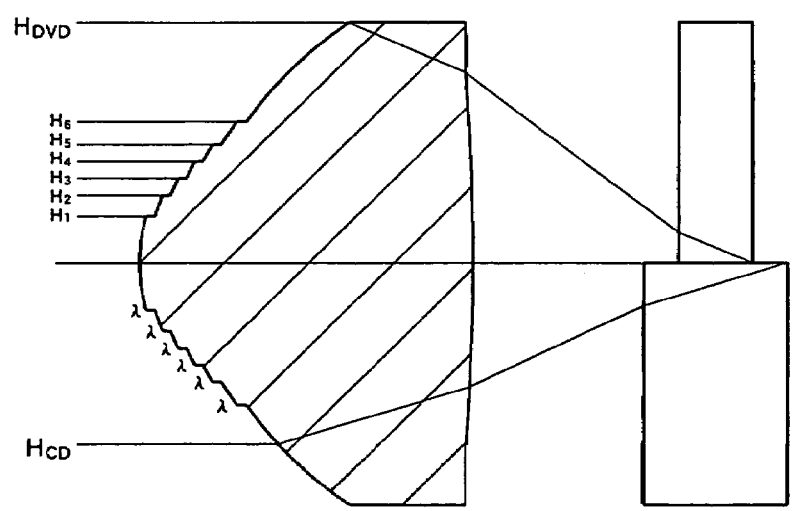
FIG. 16B shows a cross-sectional view of the objective lens according to the first embodiment.

The objective lens with the diffractive lens structure of the above design values was then formed. FIG. 16A shows a plan view of the objective lens. FIG. 16B shows a cross-sectional view of the same objective lens. As shown in FIGS. 16A and 16B, the diffractive lens structure was formed in the area within 1.110 mm from the optical axis, which is inside the area defined by the CD effective diameter corresponding to the height of 1.5 mm. The diffractive lens structure had six phase steps between the ring zones. The effective diameter of the diffractive lens area was 74.0% of the CD effective diameter. The plurality of phase steps included in the diffractive lens have a distance between them that decreases at higher heights from the optical axis, and achieves the narrowest distance between the third phase step and the forth phase step counted from inside, and increases at higher heights from there.

The non-diffractive area width within the CD effective diameter is 0.390 mm, which is larger than any distance between the plurality of phase steps included in the diffractive lens structure as shown in Table 3.

Table 4 summarizes one of other design results, the paraxial data, of the objective lens. Table 5 shows the aspherical coefficients.

In the surface numbers shown in Table 4, the number 1 (in) denotes the macroscopic aspheric surface of the diffractive lens area on the first surface of the objective lens. The number 1 (out) denotes the surface that includes the non-diffractive lens area on the first surface of the objective lens. The number 2 denotes the second surface of the objective lens. The number 3 denotes the first surface of the optical disc (DVD, CD). The number 4 denotes the second surface of the optical disc.

Figure 17:
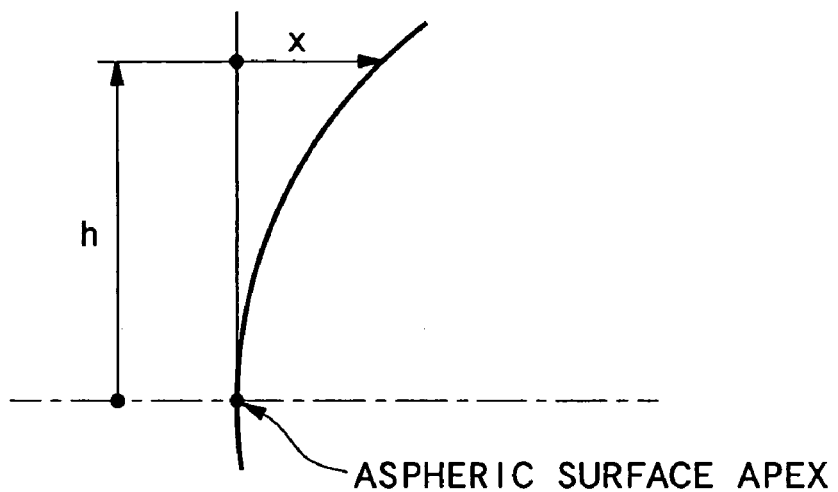
FIG. 17 shows an illustrative view of variables in the aspheric equation.

The aspherical coefficients shown in Table 5 are the coefficients in the aspheric equation defined by the following equation (Equation (2)). The r in the aspheric equation is the paraxial curvature radius (curvature radius at h=0), and specifically, is the curvature radius of each surface in the paraxial data shown in Table 4. As shown in FIG. 17, the h in the aspheric equation denotes the height, and the x is the sag amount which denotes the distance in the optical axis direction from the tangent at the apex of the aspheric surface to the lens surface.

[Equation (2)]

$$x = \frac{h^2/r}{1 + \sqrt{1 - (1+cc) \cdot h^2/r^2}} + \sum_{i=2} A_{2i} \cdot h^{2i}$$

Figure 18A:
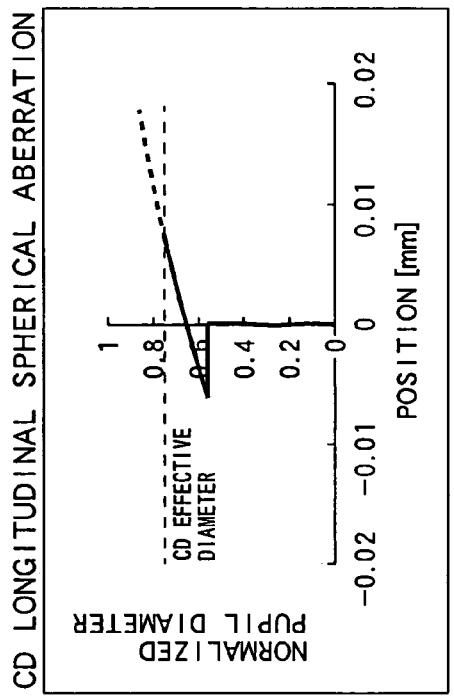
FIG. 18A shows a longitudinal spherical aberration curve calculated by the phase function method for DVD with the objective lens according to the first example.
Figure 18B:
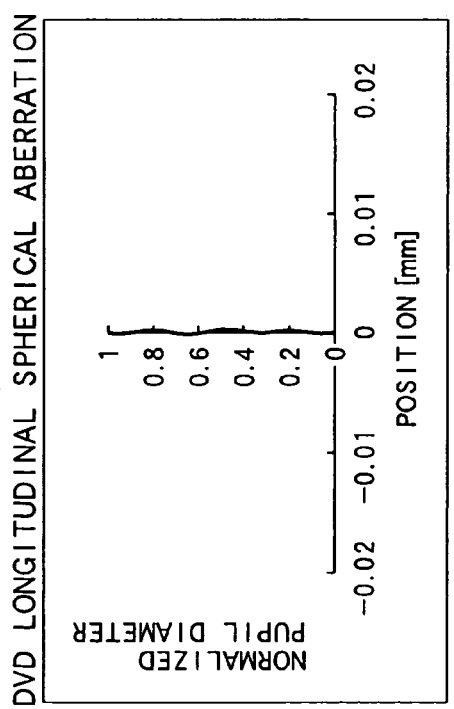
FIG. 18B shows a longitudinal spherical aberration curve calculated by the phase function method for CD with the same objective lens.
Figure 18C:
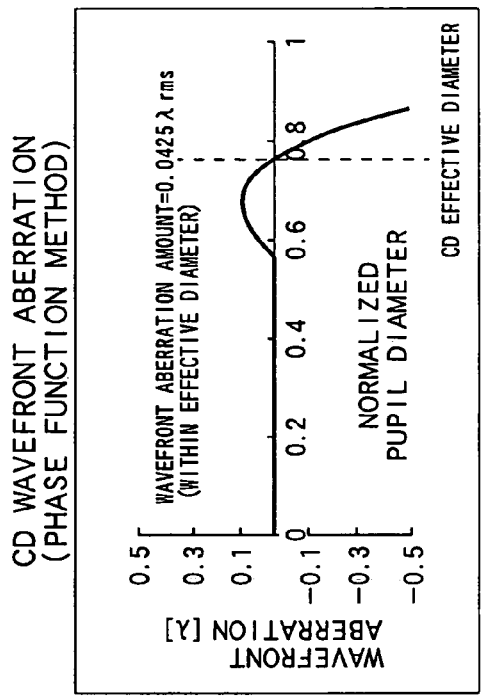
FIG. 18C shows a wavefront aberration curve calculated by the phase function method for DVD with the same objective lens.
Figure 18D:
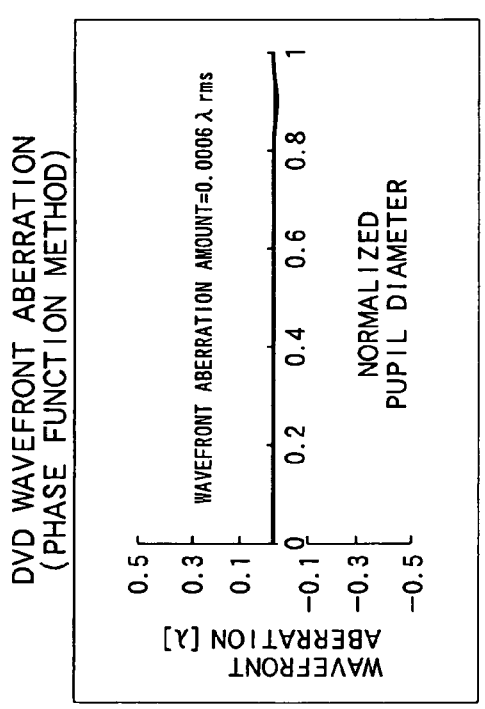
FIG. 18D shows a wavefront aberration curve calculated by the phase function method for CD with the same objective lens.
Figure 18E:
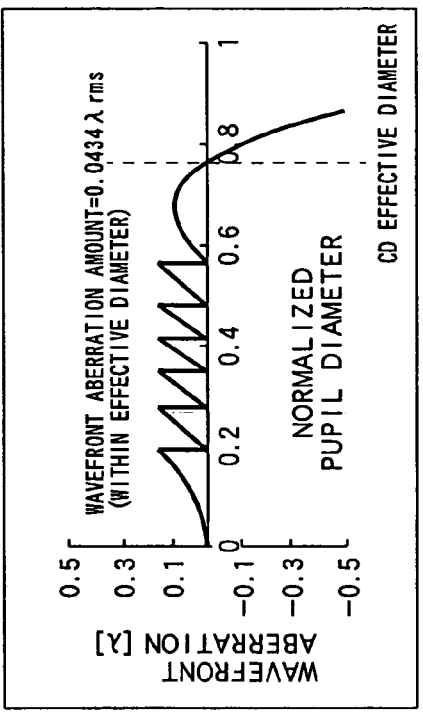
FIG. 18E shows an actual wavefront aberration curve for DVD with the same objective lens.
Figure 18F:
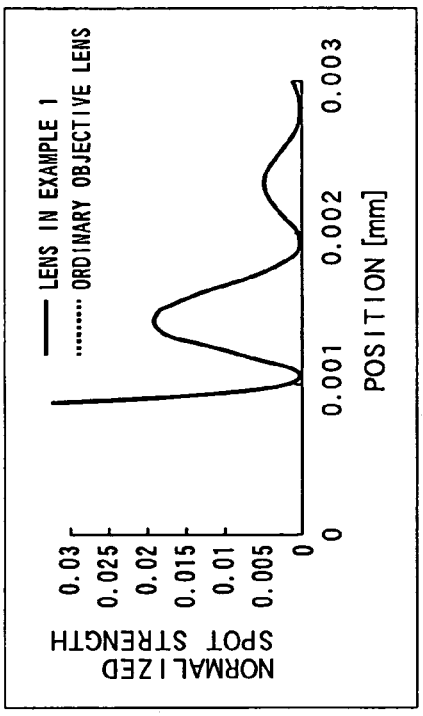
FIG. 18F shows an actual wavefront aberration curve for CD with the same objective lens.
Figure 18G:
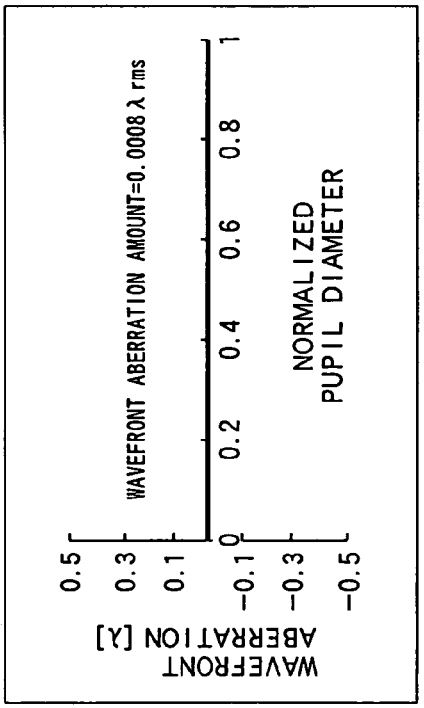
FIG. 18G shows a spot shape for CD focused by the same objective lens.
Figure 18H:
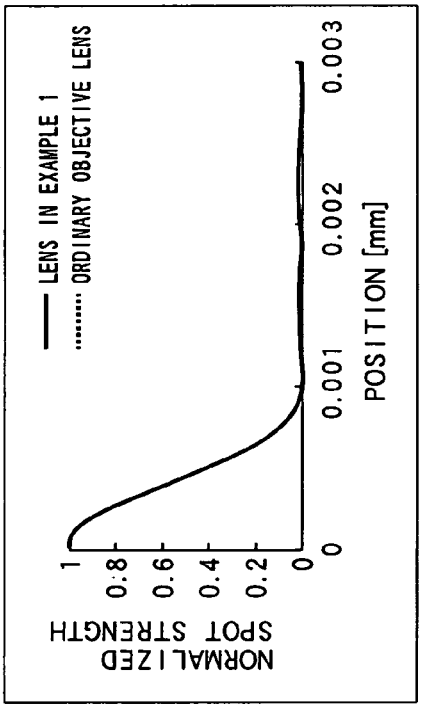
FIG. 18H shows an enlarged view of the side lobe of the same spot shape.

FIGS. 18A to 18H show the longitudinal spherical aberration curve, the wavefront aberration curve, and the CD spot shape for the laser beam focused with the objective lens as formed above. FIG. 18A shows a longitudinal spherical aberration curve calculated by the phase function method for DVD. FIG. 18B shows a longitudinal spherical aberration curve calculated by the phase function method for CD. FIG. 18C shows a wavefront aberration curve calculated by the phase function method for DVD. FIG. 18D shows a wavefront aberration curve calculated by the phase function method for CD. FIG. 18E shows an actual wavefront aberration curve for DVD in consideration of even the phase step deviation. FIG. 18F shows an actual wavefront aberration curve for CD in consideration of even the phase step deviation. It should be noted that a phase shift due to the phase step, which is an integral multiple of the wavelength, is subtracted from these wavefront aberrations. FIGS. 18G and 18H show spot shapes for CD focused by this objective lens.

As shown in FIGS. 18A to 18H, the DVD has little longitudinal spherical aberration or wavefront aberration and has a good wavefront aberration amount of 0.0006λ rms. The CD has some longitudinal spherical aberration and wavefront aberration in the non-diffractive lens area, but has a good wavefront aberration amount of 0.0425λ rms, which is sufficiently lower than the standard value. 0.07λ rms for the diffraction-limited performance. The phase differences caused by the phase steps are set at 650 nm, which is somewhat lower than the reproduction wavelength of 780 nm for the CD. The actual wavefront aberration of the CD thus involves the sawtooth-waveform aberration in the diffraction area. The actual wavefront aberration is 0.0434λ rms, which is lower than the standard value for the diffraction-limited performance. The spot shape calculated from the actual wavefront aberration shape for the CD showed almost the same spot size and side lobe as the spot focused with the ordinary objective lens exclusively used in the CD, regardless of some remaining aberrations. The use efficiency of the light beam is reduced somewhat because of the strehl ratio reduced in response to the aberration. The lens according to this example, however, shows a strehl ratio of 92.8% during reproducing CD, which is not practically a problem. Any laser beam outside the CD effective diameter will offer flare diffusion due to the aberration, thereby not impacting the CD reproduction.

(2) Example 2

This example 2 relates to an objective lens with a diffractive lens structure for use in the DVD/CD compatible reproducing (recording) apparatus.

The objective lens in the example 2 includes the diffractive lens structure formed based on the design result of the diffractive lens structure in the example 1 by eliminating the outermost ring zone. The phase matching between the diffractive lens area and the non-diffractive lens area is obtained by forming the outermost phase step to provide a phase difference that generally corresponds to two wavelengths.

The design conditions for the DVD and CD, and the phase coefficients $d_n$ in the phase function for correcting the wavefront aberration are the same as in the example 1. Table 6 summarizes the design values for the diffractive lens structure with the outermost ring zone eliminated. Tables 7 and 8 summarize the paraxial data and the aspherical coefficients of the objective lens, respectively.

Figure 19A:
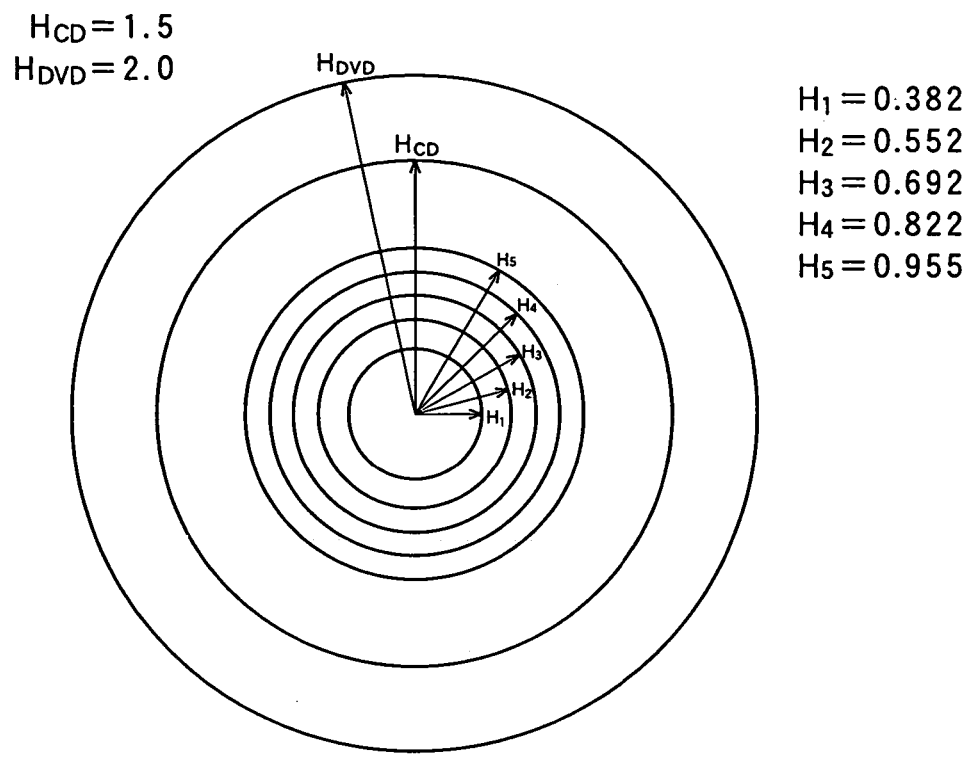
FIG. 19A shows a plan view of the objective lens according to the second example.
Figure 19B:
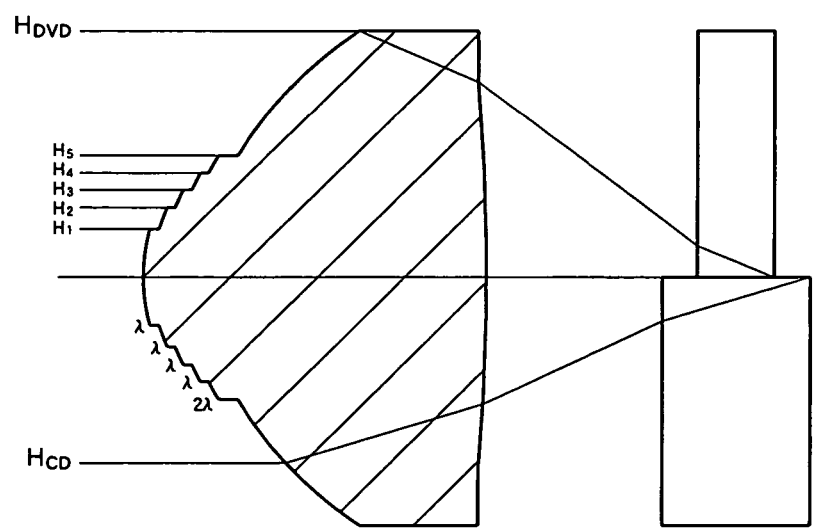
FIG. 19B shows a cross-sectional view of the objective lens according to the second example.

FIG. 19A shows a plan view of the objective lens with the diffractive lens structure as designed above. FIG. 19B shows a cross-sectional view of the same objective lens. As shown in FIGS. 19A and 19B, the diffractive lens structure was formed in the area within 0.955 mm from the optical axis, which is inside the area defined by the CD effective diameter corresponding to the height of 1.5 mm. The diffractive lens structure had five phase steps between the ring zones. The effective diameter of the diffractive lens area was 63.7% of the CD effective diameter. The plurality of phase steps included in the diffractive lens had a distance between them that decreases at higher heights from the optical axis, and achieves the narrowest distance between the third phase step and the forth phase step counted from inside, and increases at higher heights from there.

The non-diffractive area width within the CD effective diameter is 0.545 mm, which is larger than any distance between the plurality of phase steps included in the diffractive lens structure as shown in Table 6.

Figure 20A:
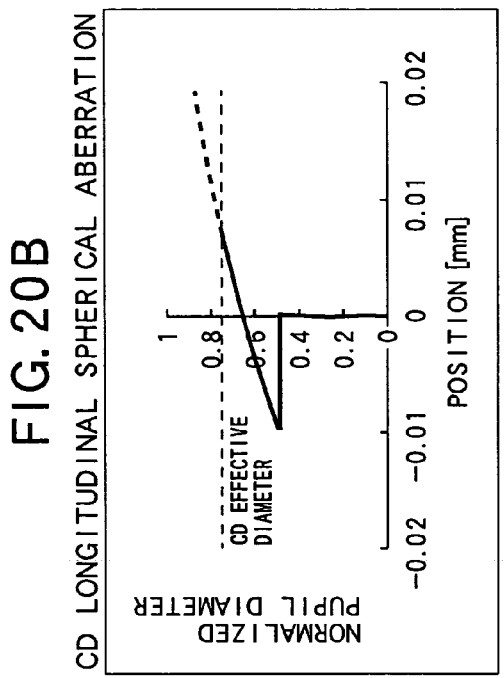
FIG. 20A shows a longitudinal spherical aberration curve calculated by the phase function method for DVD with the objective lens according to the second example.
Figure 20B:
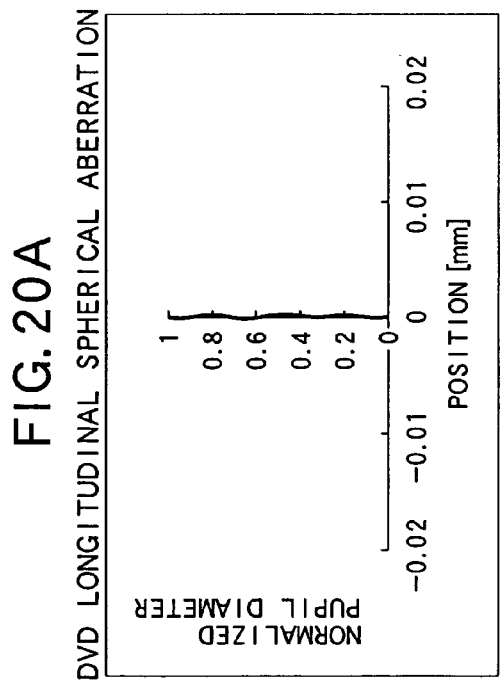
FIG. 20B shows a longitudinal spherical aberration curve calculated by the phase function method for CD with the same objective lens.
Figure 20C:
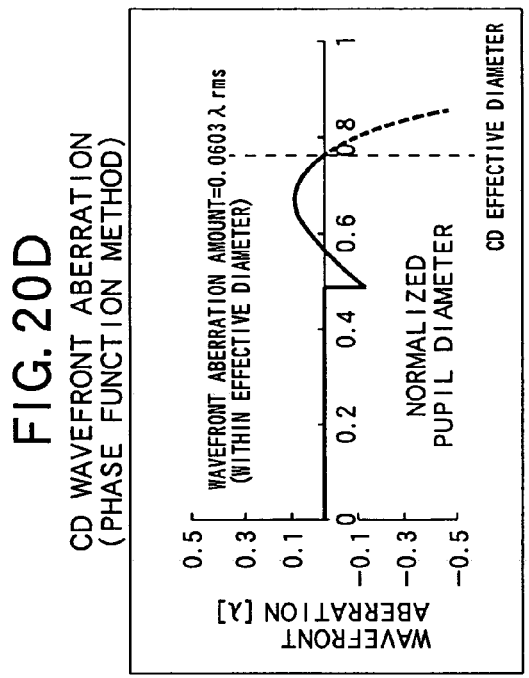
FIG. 20C shows a wavefront aberration curve calculated by the phase function method for DVD with the same objective lens.
Figure 20D:
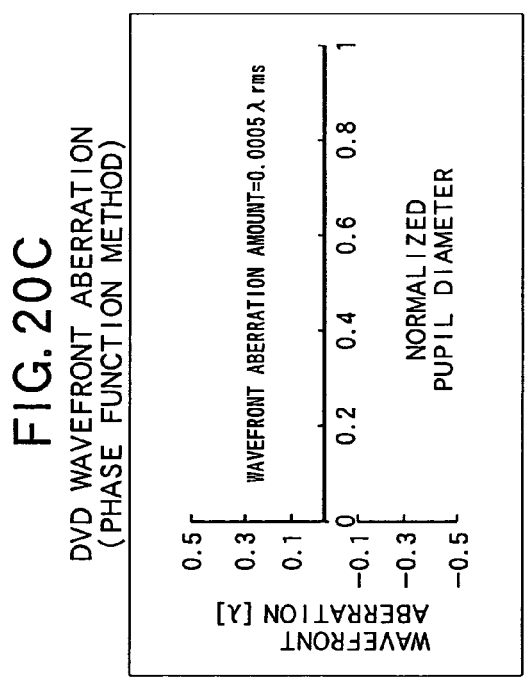
FIG. 20D shows a wavefront aberration curve calculated by the phase function method for CD with the same objective lens.
Figure 20E:
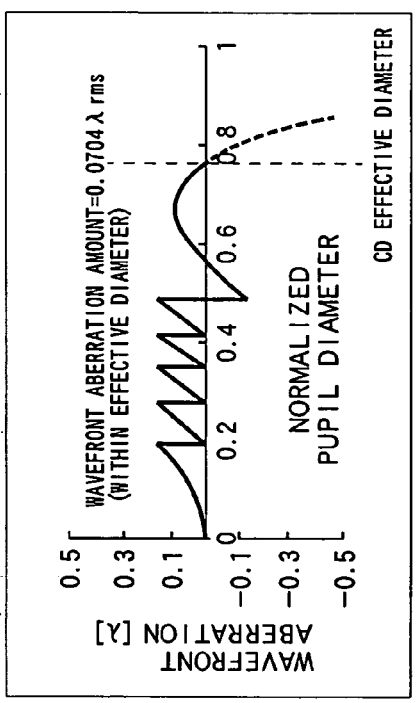
FIG. 20E shows an actual wavefront aberration curve for DVD with the same objective lens.
Figure 20F:
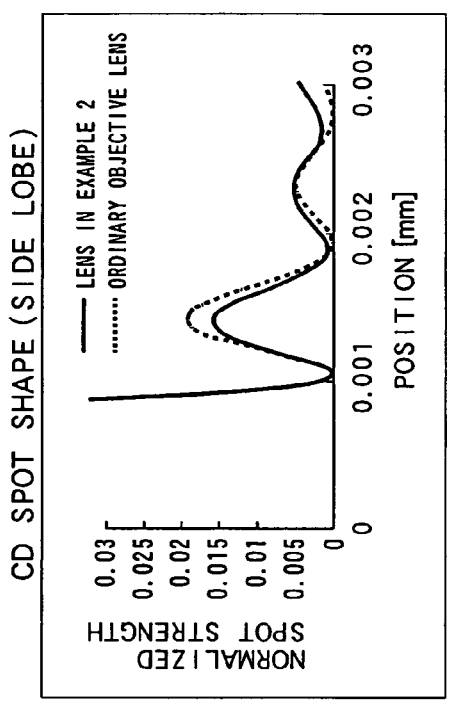
FIG. 20F shows an actual wavefront aberration curve for CD with the same objective lens.
Figure 20G:
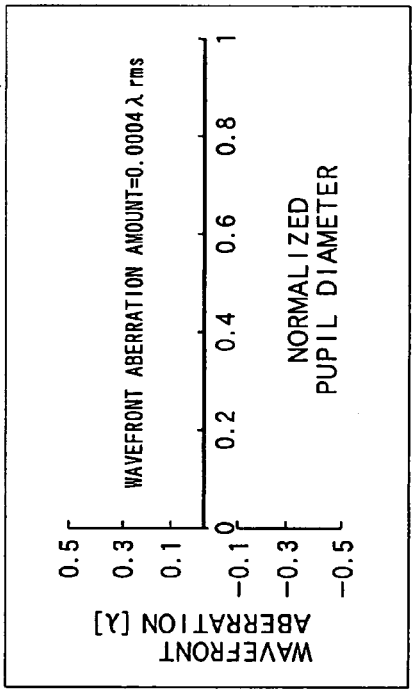
FIG. 20G shows a spot shape for CD focused by the same objective lens.
Figure 20H:
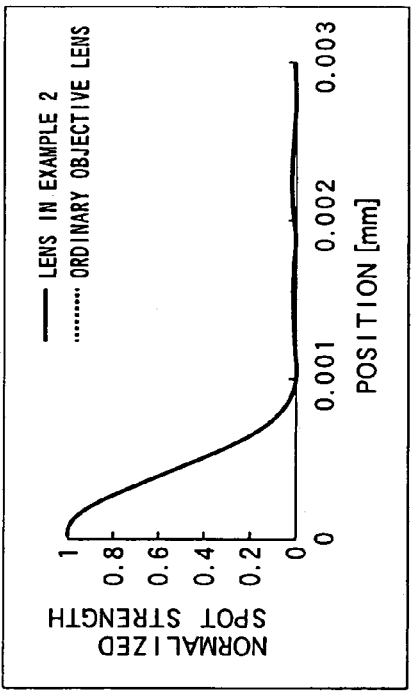
FIG. 20H shows an enlarged view of the side lobe of the same spot shape.

FIG. 20A to 20H show the longitudinal spherical aberration curve, the wavefront aberration curve, and the CD spot shape for the laser beam focused with the objective lens as formed above. FIG. 20A shows a longitudinal spherical aberration curve calculated by the phase function method for DVD. FIG. 20B shows a longitudinal spherical aberration curve calculated by the phase function method for CD. FIG. 20C shows a wavefront aberration curve calculated by the phase function method for DVD. FIG. 20D shows a wavefront aberration curve calculated by the phase function method for CD. FIG. 20E shows an actual wavefront aberration curve for DVD in consideration of even the phase step deviation. FIG. 20F shows an actual wavefront aberration curve for CD in consideration of even the phase step deviation. It should be noted that a phase shift due to the phase step, which is an integral multiple of the wavelength, is subtracted from these wavefront aberrations. FIGS. 20G and 20H show spot shapes for CD focused by this objective lens.

As shown in FIGS. 20A to 20H, the DVD has little longitudinal spherical-aberration or wavefront aberration, and has a good wavefront aberration amount of 0.0005λ rms. The CD has some longitudinal spherical aberration and wavefront aberration in the non-diffractive lens area, but has a limited wavefront aberration amount of 0.0603λ rms, which is lower than the standard value 0.07λ rms for the diffraction-limited performance. The phase differences caused by the phase steps are set at 650 nm, which is somewhat lower than the reproduction wavelength of 780 nm for the CD. The actual wavefront aberration of the CD thus involves the sawtooth-waveform aberration in the diffraction area. The actual wavefront aberration is 0.0704λ rms, which is slightly higher than the standard value for the diffraction-limited performance. Such a sawtooth-waveform aberration, however, will rarely impact the spot shape. The spot shape calculated from the actual wavefront aberration shape for the CD showed almost the same spot shape as the spot focused with the ordinary objective lens exclusively used in the CD, regardless of large remaining aberrations. The use efficiency of the light beam is reduced somewhat because of the strehl ratio reduced in response to the aberration. The lens according to this example, however, shows a strehl ratio of 82.5% during reproducing CD, which is not practically a problem. Any laser beam outside the CD effective diameter will offer flare diffusion due to the aberration, thereby not impacting the CD reproduction.

The example 2 eliminates the sixth phase step, which is required in the example 1, with the result that more aberration is calculated for the CD. The example 2, however, can focus almost the same spot shape as with the ordinary objective lens exclusively used in the CD. The acceptance of the remaining aberration allows for less phase steps, which can provide a more preferable diffractive lens structure.

(3) Example 3

This example 3 relates to an objective lens with a diffractive lens structure for use in the Blu-ray Disc/DVD compatible reproducing (recording) apparatus.

The Table 9 summarizes the design conditions for the Blu-ray Disc and DVD.

According to the design conditions described above, the phase function is specified for correcting the wavefront aberration of the laser beam for the Blu-ray Disc and DVD. The table 10 summarizes the phase coefficients $d_n$ for the phase function defined by the above-described equation (1).

The heights hare determined at which the phase function is marked off every integral multiple phase. The phase step is then set to provide a light path difference that corresponds to one wavelength (407 nm) at each height to design the diffractive lens structure. The table 11 summarizes the design values (step diameter and light path difference) of the diffractive lens structure.

Figure 21A:
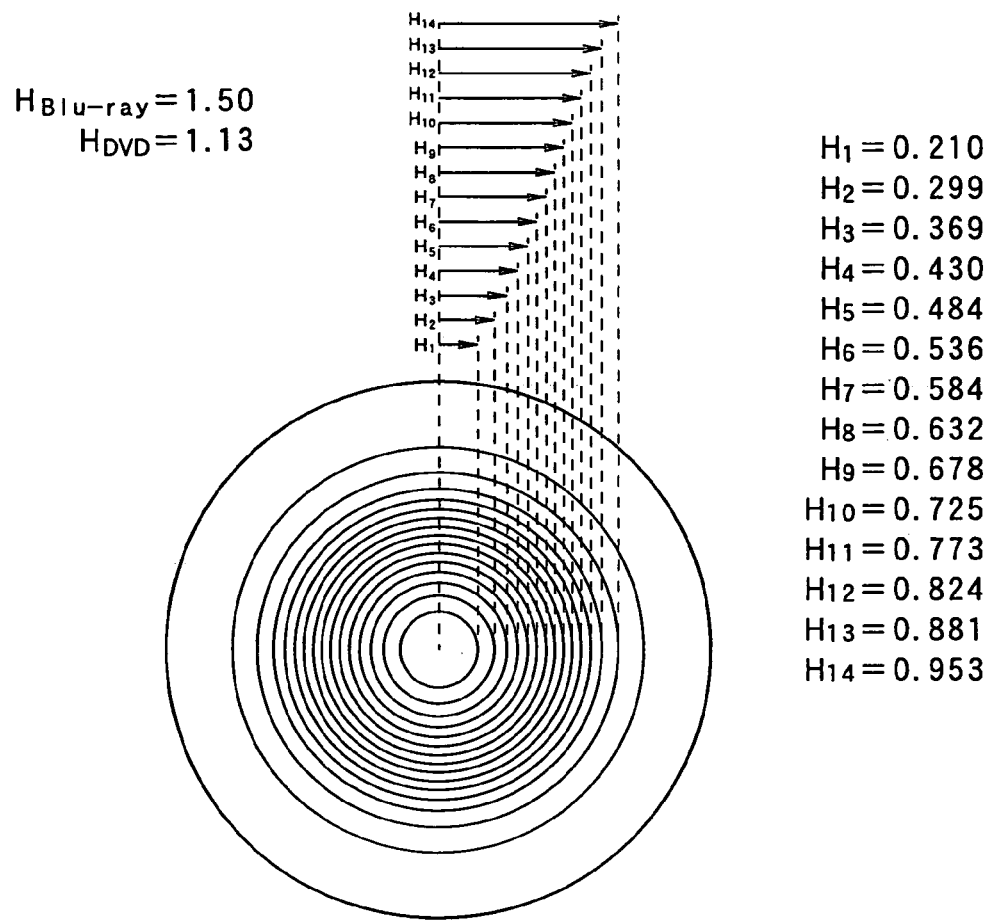
FIG. 21A shows a plan view of the objective lens according to the third example.
Figure 21B:
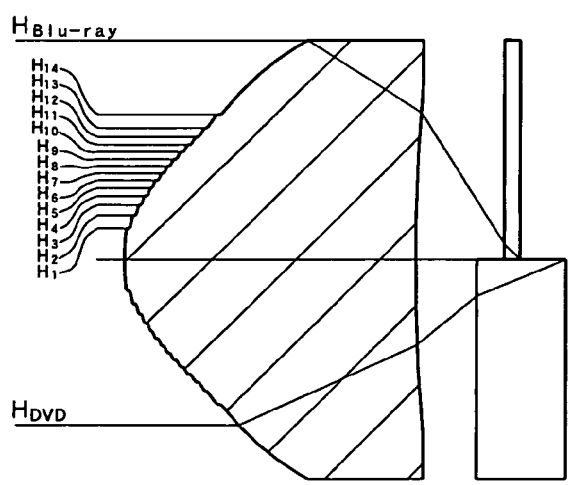
FIG. 21B shows a cross-sectional view of the objective lens according to the third example.

The objective lens with the diffractive lens structure of the above design values was then formed. FIG. 21A shows a plan view of the objective lens. FIG. 21B shows a cross-sectional view of the same objective lens. As shown in FIGS. 21A and 21B, the diffractive lens structure was formed in the area within 0.953 mm from the optical axis, which is inside the area defined by the CD effective diameter corresponding to the height of 1.13 mm. The diffractive lens structure had 14 phase steps between the ring zones. The effective diameter of the diffractive lens area was 84.3% of the DVD effective diameter. The plurality of phase steps included in the diffractive lens had a distance between them that decreases at higher heights from the optical axis, and achieves the narrowest distance between the eighth phase step and the ninth phase step counted from inside, and increases at higher heights from there.

The non-diffractive are a width within the DVD effective diameter is 0.177 mm, which is larger than any distance between the plurality of phase steps included in the diffractive lens structure as shown in Table 9.

Table 12 summarizes one of other design results, the paraxial data, of the objective lens. Table 13 shows the aspherical coefficients. The paraxial data and the aspherical coefficients can be seen in the same manner as in the example 1.

Figure 22A:
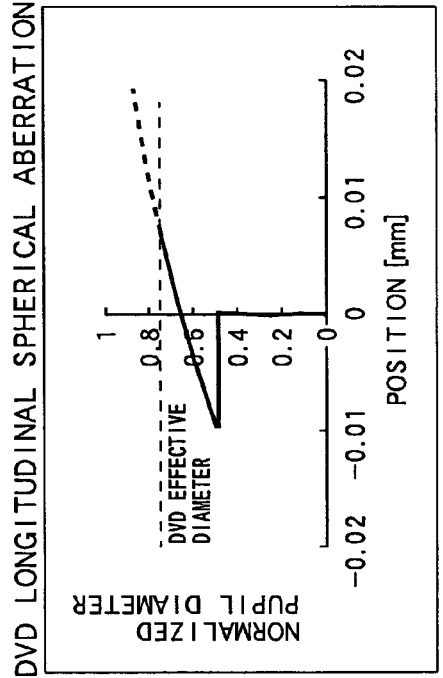
FIG. 22A shows a longitudinal spherical aberration curve calculated by the phase function method for Blu-ray Disc with the objective lens according to the third example.
Figure 22B:
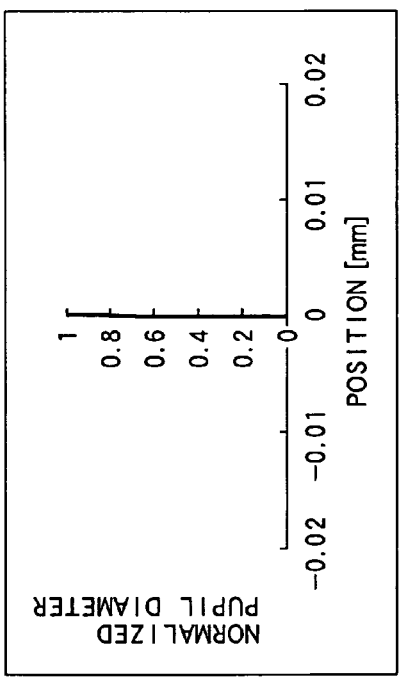
FIG. 22B shows a longitudinal spherical aberration curve calculated by the phase function method for DVD with the same objective lens.
Figure 22C:
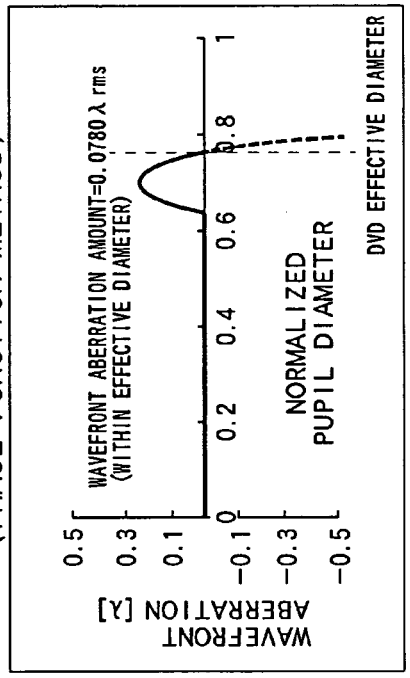
FIG. 22C shows a wavefront aberration curve calculated by the phase function method for Blu-ray Disc with the same objective lens.
Figure 22D:
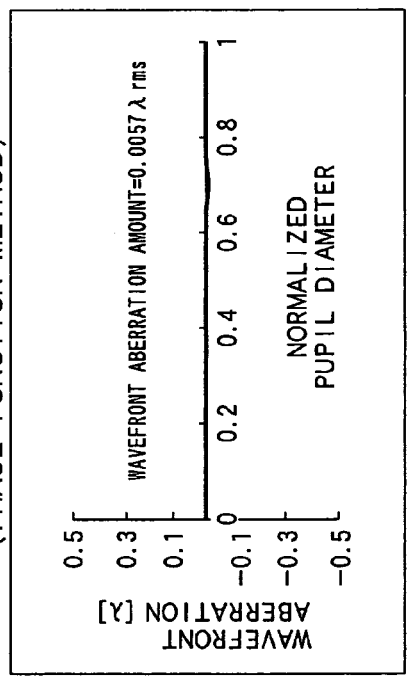
FIG. 22D shows a wavefront aberration curve calculated by the phase function method for DVD with the same objective lens.
Figure 22E:
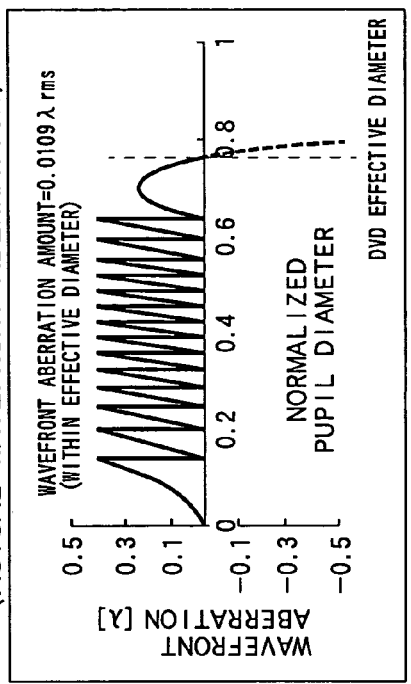
FIG. 22E shows an actual wavefront aberration curve for Blu-ray Disc with the same objective lens.
Figure 22F:
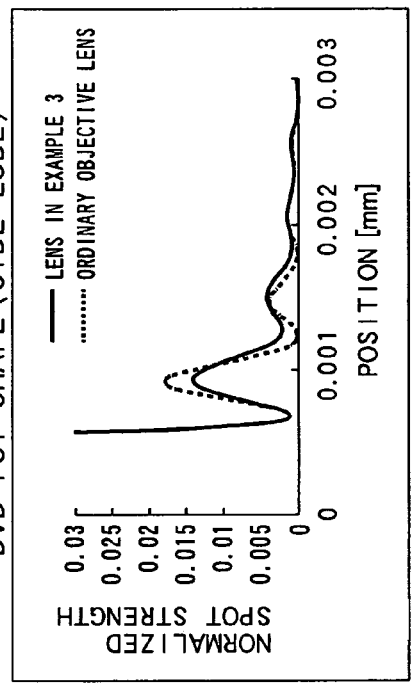
FIG. 22F shows an actual wavefront aberration curve for DVD with the same objective lens.
Figure 22G:
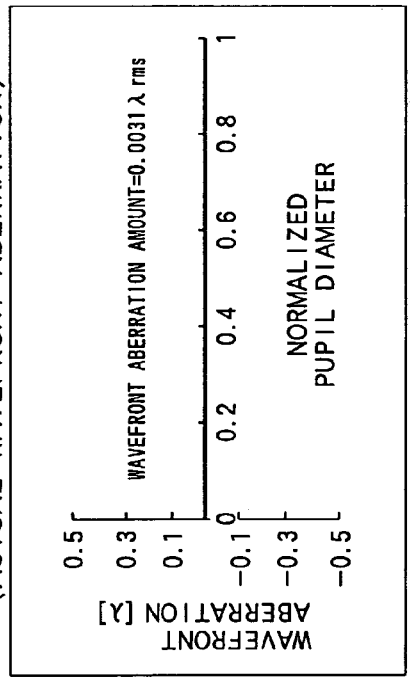
FIG. 22G shows a spot shape for DVD focused by the same objective lens.
Figure 22H:
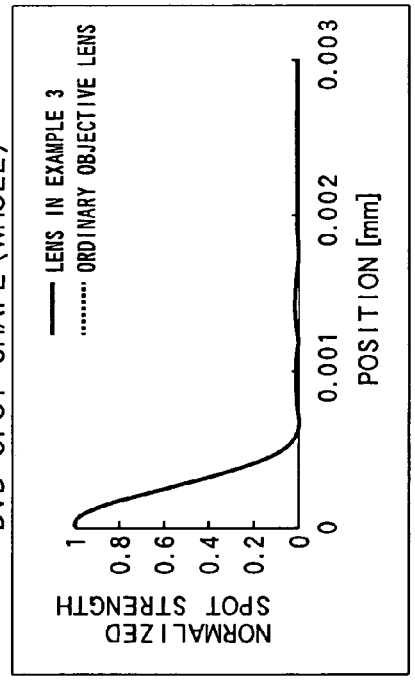
FIG. 22H shows an enlarged view of the side lobe of the same spot shape.

FIGS. 22A to 22H show the longitudinal spherical aberration curve, the wavefront aberration curve, and the DVD spot shape for the laser beam focused with the objective lens as formed above. FIG. 22A shows a longitudinal spherical aberration curve calculated by the phase function method for Blu-ray Disc. FIG. 22B shows a longitudinal spherical aberration curve calculated by the phase function method for DVD. FIG. 22C shows a wavefront aberration curve calculated by the phase function method for Blu-ray Disc. FIG. 22D shows a wavefront aberration curve calculated by the phase function method for DVD. FIG. 22E shows an actual wavefront aberration curve for Blu-ray Disc in consideration of even the phase step deviation. FIG. 22F shows an actual wavefront aberration curve for DVD in consideration of even the phase step deviation. It should be noted that a phase shift due to the phase step, which is an integral multiple of the wavelength, is subtracted from these wavefront aberrations. FIGS. 22G and 22H show spot shapes for DVD focused by this objective lens.

As shown in FIGS. 22A to 22H, the Blu-ray Disc has little longitudinal spherical aberration or wavefront aberration and has a good wavefront aberration amount of $0.0057\lambda$ rms. The DVD has the longitudinal spherical aberration and wavefront aberration in the non-diffractive lens area, and has a wavefront aberration amount of $0.0780\lambda$ rms, which is higher than the standard value $0.07\lambda$ rms for the diffraction-limited performance. The phase differences caused by the phase steps are set at 407 nm, which is lower than the reproduction wavelength of 650 nm for the DVD. The actual wavefront aberration of the DVD thus involves the sawtooth-waveform aberration in the diffraction area. The actual wavefront aberration of the DVD is therefore $0.109\lambda$ rms, which is much higher than the standard value for the diffraction-limited performance. Such a sawtooth-waveform aberration, however, will rarely impact the spot shape. The spot shape calculated from the actual wavefront aberration shape for the DVD showed almost the same spot size and side lobe as the spot focused with the ordinary objective lens exclusively used in the DVD, regardless of large remaining aberrations. The use efficiency of the light beam is reduced somewhat because of the strehl ratio reduced in response to the aberration. The lens according to this example, however, shows a strehl ratio of 61.5% during reproducing DVD, which is not practically a problem. Any laser beam outside the DVD effective diameter will offer flare diffusion due to the aberration, thereby not impacting the DVD reproduction.

As shown in FIGS. 21A and 21B, all the lens edge angles in the objective lens cross section are obtuse angles more than 90 degrees so that the objective lens is not fastened on the die.

As shown in Table 9, the optical disc (Blu-ray Disc) reproduced with a laser beam with a wavelength of 407 nm needs a numerical aperture of 0.85 for reproduction (recording) To be compatible with the DVD, the optical disc thus needs to use an objective lens of a single lens, which provides a longer working distance (spacing between the lens and the optical disc). The objective lens should then not be made from resin that may significantly change the lens characteristics due to temperature changes. The objective lens is usually made from glass that may slightly change the lens characteristics due to temperature changes. This example therefore uses glass for the objective lens. The die for glass mold is generally high in hardness and hard to work. And the lens may destroy the die due to the thermal expansion coefficient difference between the die and the glass, when the die has acute edge angles and fine structures. A large effect can thus be obtained by forming the objective lens with a design in which the diffractive lens structure has a few ring zones and the phase step edge of each ring zone has the obtuse angle, as described above.

In other words, the present invention can be applied to the compatible information reproducing (recording) apparatus that can reproduce the optical disc (Blu-ray Disc) which needs a high numerical aperture, thereby providing much more beneficial operational advantages.

Figure 23A:
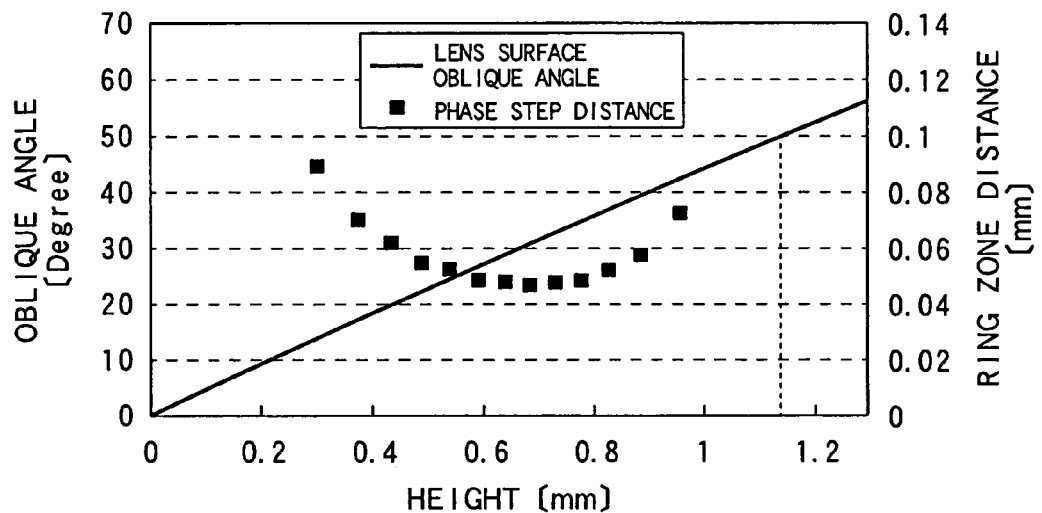
FIG. 23A shows a relationship of the lens surface oblique angle and the distance between phase steps for the objective lens according to the third example.
Figure 23B:
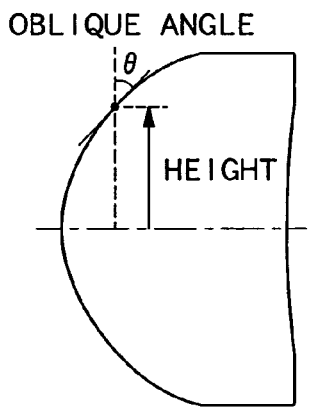
FIG. 23B shows an illustrative view of the definition of the lens surface oblique angle.
Figure 23C:
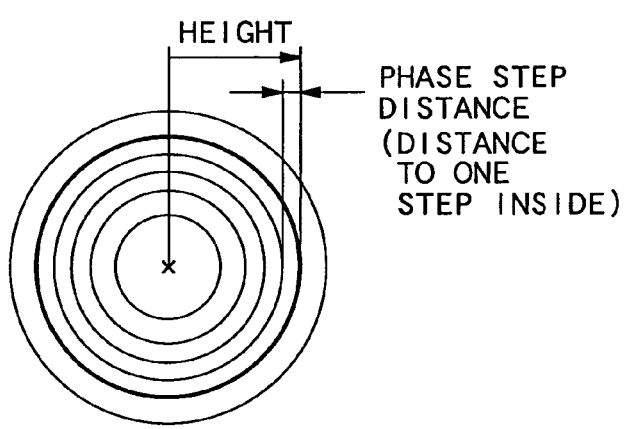
FIG. 23C shows an illustrative view of the definition of the distance between phase steps.

This is also apparent from FIGS. 23A to 23C from the relationship between the lens surface oblique angle and the distance between phase steps.

Specifically, as shown in FIG. 23A, the diffractive lens structure is not located in an area (which is outside about 1 mm from the optical axis) that has a larger lens oblique angle, and the distance between phase steps is relatively roughly formed and at least about 0.05 mm. The die can thus be relatively easily cut. FIG. 23B shows the definition of the lens surface oblique angle. FIG. 23C shows the definition of the distance between phase steps.

Figure 24B:
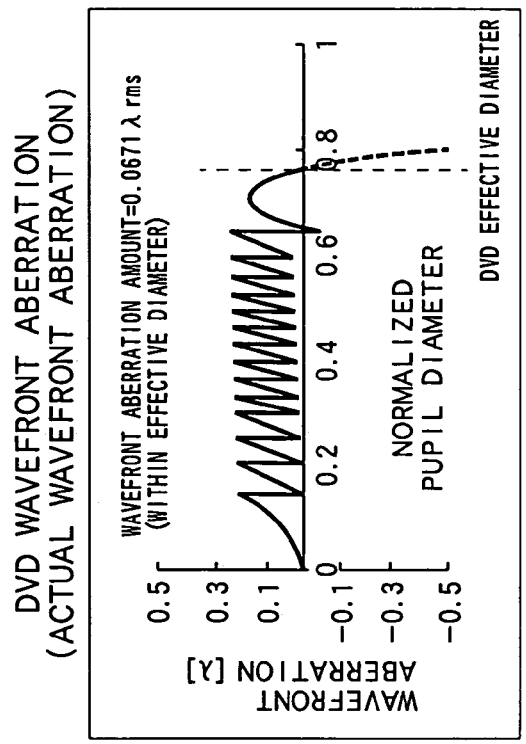
FIG. 24B shows an actual wavefront aberration for DVD of the same objective lens.
Figure 24A:
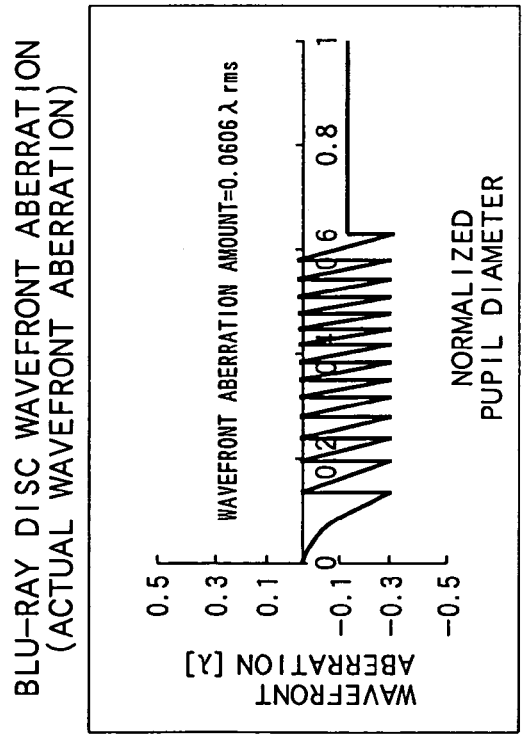
FIG. 24A shows an actual wavefront aberration for Blu-ray Disc of the objective lens according to the third example, with the phase difference amount generated at its phase steps being modified to 518 nm.

The lens in the example 3 is designed with the design diffraction order of 1 for both the Blu-ray Disc and the DVD. This causes a large remaining sawtooth-waveform aberration of $0.109\lambda$ rms for the DVD. Less loss of light intensity for the DVD can be obtained by setting the phase difference amount generated at the phase steps between 407 nm and 650 nm to balance the remaining sawtooth-waveform aberration for the Blu-ray Disc and the DVD FIGS. 24A and 24B show an actual wavefront aberration based on the lens in the third example, with the phase difference amount generated at the phase steps being modified to one wavelength of 518 nm. FIG. 24A shows the actual wavefront aberration for the Blu-ray Disc. FIG. 24B shows the actual wavefront aberration for the DVD. Such a setting of the phase difference amount can provide a remaining aberration of $0.07\lambda$ rms or less for both the Blu-ray Disc and the DVD. It was, however, impossible to provide an aberration value of $0.05\lambda$ rms or less for both.

Figure 25B:
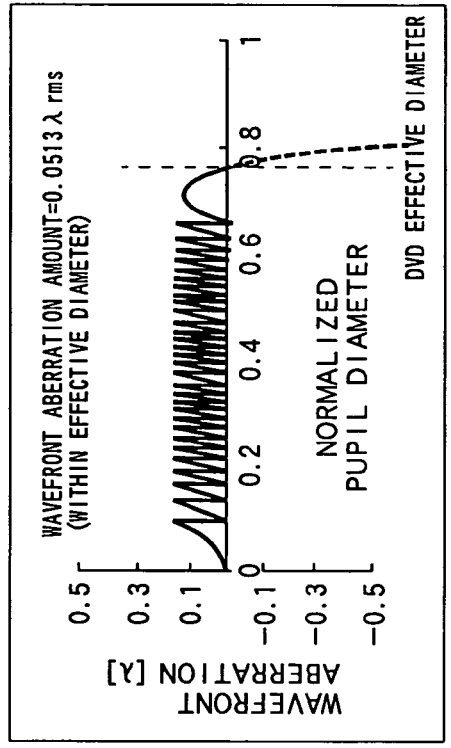
FIG. 25B shows an actual wavefront aberration for DVD of the same objective lens.
Figure 25A:
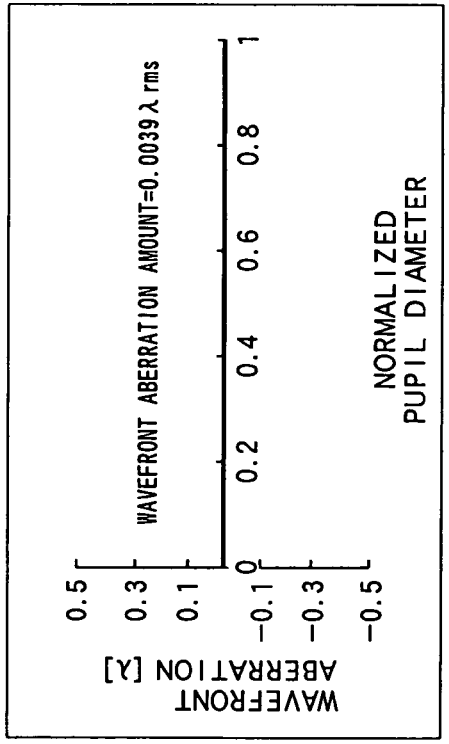
FIG. 25A shows an actual wavefront aberration for Blu-ray Disc of the objective lens designed with the design diffraction order of 2 for Blu-ray Disc and the design diffraction order of 1 for DVD.

The sawtooth-waveform aberration can be reduced by setting the design diffraction order of 2 for the Blu-ray Disc and the design diffraction order of 1 for the DVD. FIGS. 25A and 25B show an actual wavefront aberration for a lens with the design diffraction order of 2 for the Blu-ray Disc and the design diffraction order of 1 for DVD and with the phase difference generated at the phase steps set to two wavelengths ($2 \times 407$ nm). The FIG. 25A shows the actual wavefront aberration for the Blu-ray Disc. FIG. 25B shows the actual wavefront aberration for the DVD. The phase difference generated at the phase steps is exactly an integral multiple of the reproduction wavelength of the Blu-ray Disc. The actual wavefront aberration for the Blu-ray Disc can thus be a sufficiently small value of $0.0039\lambda$ rms. For the reproduction wavelength of the DVD, the phase difference amount generated at the phase steps which is slightly more than 650 nm causes the sawtooth-waveform aberration remaining in the actual wavefront aberration for the DVD. The deviation of the phase steps is, however, smaller than in the example 3, thereby making it possible to provide a remaining aberration of $0.0513\lambda$ rms or less. The phase step amount can also be adjusted to balance the remaining aberration for the Blu-ray Disc and the DVD to provide a wavefront aberration of $0.05\lambda$ rms or less for both the discs.

Figure 26:
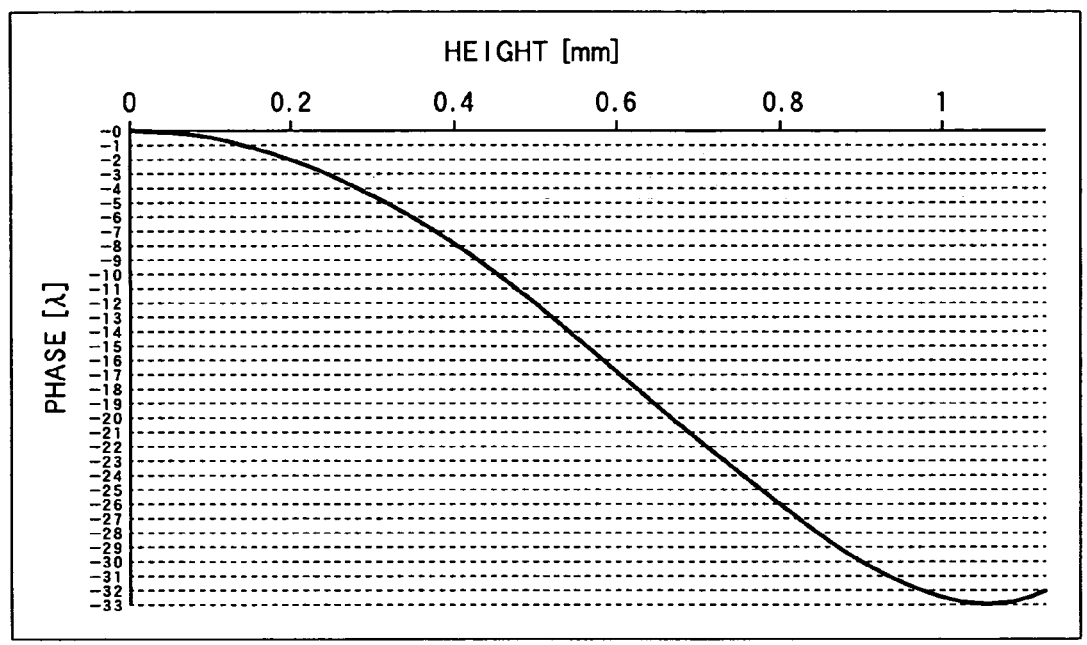
FIG. 26 shows a phase function curve needed for the diffractive lens structure of the objective lens designed with the design diffraction order of 2 for Blu-ray Disc and the design diffraction order of 1 for DVD.

FIG. 26 shows a phase function curve of the above-described lens, which is designed with the design diffraction order of 2 for the Blu-ray Disc and the design diffraction order of 1 for the DVD. This phase function monotonously decreases in the diffractive lens area. The diffractive lens structure is thus formed in such a way that each ring zone is blazed to make its thickness decrease radially outward on the lens than the macroscopic aspheric surface. The diffractive lens structure is also formed to have the phase steps in such a way that the thickness of the objective lens increases at the heights at which the phase function $\phi$ is marked off every integral multiple phase. Such a diffractive lens structure formed will have acute angles on the edges of the phase steps between the ring zones, as in the conventional example shown in the enlarged view of FIG. 12. The phase function will have a steeper slope and the diffractive lens structure will need 32 phase steps. In other words, the design diffraction order of 2 for the Blu-ray Disc and the design diffraction order of 1 for the DVD can reduce the sawtooth-waveform aberration, but will have acute angles on the edges of the phase steps between the ring zones and will need more ring zones, thereby suffering from the same disadvantages as for the conventional diffractive lens structure. The compatible reproducing (record) apparatus for the Blu-ray Disc and the DVD can thus be achieved by intentionally accepting the remaining aberration of $0.05\lambda$ rms to $0.13\lambda$ rms as described in the example 3 to significantly improve the disadvantages of the conventional diffractive lens structure.

It should be understood that various alternatives to the embodiment of the invention described herein may be employed in practicing the invention. Thus, it is intended that the following claims define the scope of the invention and that methods and structures within the scope of these claims and their equivalents be covered thereby.

The entire disclosure of Japanese Patent Application No. 2003-131262 filed on May 9, 2003 and No. 2004-12270 filed on Jan. 20, 2004 including the specification, claims, drawings and summary is incorporated herein by reference in its entirety.

TABLE 1

|  | DVD | CD |
| --- | --- | --- |
| Focal point length (mm) | 3.30 | 3.34 |
| Lens numerical aperture | 0.60 | 0.45 |
| Laser beam wavelength [nm] | 650 | 780 |
| Design diffraction order | 1 | 1 |

TABLE 2

| Name of coefficient | Inner area of first surface |
| --- | --- |
| $d_2$ | 4.599480E−03 |
| $d_4$ | −1.042190E−03 |
| $d_6$ | −1.106420E−04 |

TABLE 2-continued

| Name of coefficient | Inner area of first surface |
| --- | --- |
| $d_8$ | 1.248550E−05 |
| $d_{10}$ | −4.116700E−06 |

The design wavelength is 650 nm.

TABLE 3

| Step diameter | Step distance | Light path difference |
| --- | --- | --- |
| 0.382 |  | $1\lambda$ |
| 0.552 | 0.170 | $1\lambda$ |
| 0.692 | 0.140 | $1\lambda$ |
| 0.822 | 0.130 | $1\lambda$ |
| 0.955 | 0.133 | $1\lambda$ |
| 1.110 | 0.155 | $1\lambda$ |

$\lambda = 650$ nm

TABLE 4

| Surface number | Diameter of curvature | Central thickness (DVD) | Central thickness (CD) | Refraction index (DVD) | Refraction index (CD) | Range |
| --- | --- | --- | --- | --- | --- | --- |
| 1 (in) | 1.9421500 | 2.2000000 | ← | 1.5232450 | 1.5197300 | $0 \leq h \leq 1.110$ |
| 1 (out) | 2.0082000 | 2.1925480 | ← | 1.5232450 | 1.5197300 | $1.110 < h \leq 2.000$ |
| 2 | −7.6289000 | 1.6801200 | 1.3372030 | 1.0000000 | ← |  |
| 3 | ∞ | 0.6000000 | 1.2000000 | 1.5803220 | 1.5740810 |  |
| 4 | ∞ | 0.0000000 | ← | 1.0000000 | ← |  |

TABLE 5

| Name of coefficient | Inner area of first surface | Outer area of first surface | Second surface |
| --- | --- | --- | --- |
| CC | −3.178780E−01 | −2.488700E−01 | −4.217600E+01 |
| $A_4$ | −5.289300E−03 | −3.586500E−03 | 7.582100E−03 |
| $A_6$ | −8.226690E−04 | −6.067000E−04 | −1.589600E−04 |
| $A_8$ | −2.147930E−06 | −7.845500E−06 | −3.090400E−04 |
| $A_{10}$ | −3.552780E−05 | −3.037700E−05 | 1.469600E−04 |

TABLE 6

| Step diameter | Step distance | Light path difference |
| --- | --- | --- |
| 0.382 |  | $1\lambda$ |
| 0.552 | 0.170 | $1\lambda$ |
| 0.692 | 0.140 | $1\lambda$ |
| 0.822 | 0.130 | $1\lambda$ |
| 0.955 | 0.133 | $2\lambda$ |

$\lambda = 650$ nm

TABLE 7

| Surface number | Radius of curvature | Central thickness (DVD) | Central thickness (CD) | Refraction index (DVD) | Refraction index (CD) | Range |
|---|---|---|---|---|---|---|
| 1 (in)  | 1.9421500  | 2.2000000 | ← | 1.5232450 | 1.5197300 | $0 \leq h \leq 0.955$ |
| 1 (out) | 2.0082000  | 2.1925480 | ← | 1.5232450 | 1.5197300 | $0.955 < h \leq 2.000$ |
| 2       | −7.6289000 | 1.6801200 | 1.3372030 | 1.0000000 | ← | |
| 3       | ∞          | 0.6000000 | 1.2000000 | 1.5803220 | 1.5740810 | |
| 4       | ∞          | 0.0000000 | ← | 1.0000000 | ← | |

TABLE 8

| Name of coefficient | Inner area of first surface | Outer area of first surface | Second surface |
|---|---|---|---|
| CC       | −3.178780E−01 | −2.488700E−01 | −4.217600E+01 |
| $A_4$    | −5.289300E−03 | −3.586500E−03 | 7.582100E−03 |
| $A_6$    | −8.226690E−04 | −6.067000E−04 | −1.589600E−04 |
| $A_8$    | −2.147930E−06 | −7.845500E−06 | −3.090400E−04 |
| $A_{10}$ | −3.552780E−05 | −3.037700E−05 | 1.469600E−04 |

TABLE 9

| | Blu-ray | DVD |
|---|---|---|
| Focal point length [mm] | 1.76 | 1.92 |
| Lens numerical aperture | 0.85 | 0.60 |
| Laser beam wavelength [nm] | 407 | 650 |

TABLE 9-continued

| | Blu-ray | DVD |
|---|---|---|
| Design diffraction order | 1 | 1 |

TABLE 10

| Name of coefficient | Inner area of first surface |
|---|---|
| $d_2$    | 9.310120E−03 |
| $d_4$    | −2.507680E−03 |
| $d_6$    | −1.035090E−03 |
| $d_8$    | 3.799510E−04 |
| $d_{10}$ | −2.811260E−04 |

The design wavelength is 407 nm.

TABLE 11

| No. | Step diameter | Step interval | Light path difference |
|---|---|---|---|
| 1  | 0.210 |       | $1\lambda$ |
| 2  | 0.299 | 0.089 | $1\lambda$ |
| 3  | 0.369 | 0.070 | $1\lambda$ |
| 4  | 0.430 | 0.061 | $1\lambda$ |
| 5  | 0.484 | 0.054 | $1\lambda$ |
| 6  | 0.536 | 0.052 | $1\lambda$ |
| 7  | 0.584 | 0.048 | $1\lambda$ |
| 8  | 0.632 | 0.048 | $1\lambda$ |
| 9  | 0.678 | 0.046 | $1\lambda$ |
| 10 | 0.725 | 0.047 | $1\lambda$ |
| 11 | 0.773 | 0.048 | $1\lambda$ |
| 12 | 0.824 | 0.051 | $1\lambda$ |
| 13 | 0.881 | 0.057 | $1\lambda$ |
| 14 | 0.953 | 0.072 | $1\lambda$ |

$\lambda = 407$ nm

TABLE 12

| Surface number | Radius of curvature | Central thickness (Blu-ray) | Central thickness (DVD) | Refraction index (Blu-ray) | Refraction index (DVD) | Range |
|---|---|---|---|---|---|---|
| 1 (in)  | 1.2445000   | 1.9000000 | ← | 1.7097600 | 1.6670840 | $0 \leq h \leq 0.953$ |
| 1 (out) | 1.2831700   | 1.8919780 | ← | 1.7097600 | 1.6670840 | $0.953 < h \leq 2.000$ |
| 2       | −18.3470000 | 0.6210030 | 0.4311430 | 1.0000000 | ← | |
| 3       | ∞           | 0.1000000 | 0.6000000 | 1.6183860 | 1.5803220 | |
| 4       | ∞           | 0.0000000 | ← | 1.0000000 | ← | |

TABLE 13

| Name of coefficient | Inner area of first surface | Outer area of first surface | Second surface |
|---|---|---|---|
| CC       | −7.491330E−01 | −7.909760E−01 | 1.423400E+00 |
| $A_4$    | 1.677610E−02  | 2.275960E−02  | 1.940200E−01 |
| $A_6$    | 2.098220E−03  | 4.562020E−03  | −2.397400E−01 |
| $A_8$    | 6.838670E−03  | 5.554710E−03  | 2.935300E−02 |
| $A_{10}$ | −1.142260E−02 | −9.369080E−03 | 5.754100E−01 |
| $A_{12}$ | 1.435640E−02  | 1.252750E−02  | −1.283000E+00 |
| $A_{14}$ | −1.119060E−02 | −9.712710E−03 | 1.437300E+00 |
| $A_{16}$ | 5.158720E−03  | 4.419760E−03  | −9.190200E−01 |
| $A_{18}$ | −1.281800E−03 | −1.063630E−03 | 3.190200E−01 |
| $A_{20}$ | 1.289280E−04  | 1.016190E−04  | −4.678800E−02 |

What is claimed is:

1. An optical pickup comprising:
   a light source for emitting a plurality of laser beams with different wavelengths; and an objective lens for focusing the laser beams emitted from said light source on recording surfaces of plural types of information recording media, wherein a diffractive lens structure is provided in a light path of said laser beam, said structure including ring zone areas divided by a plurality of phase steps for correcting a wavefront aberration of said laser beam, a diameter of an outermost phase step of said diffractive lens structure is smaller than a second largest effective diameter of effective diameters required for reproduction of said plural types of information recording media, wherein a focused point of a reproducing laser beam which passes through said diffractive lens structure during reproducing at least one of those of said plural types of information recording media that are other than an information recording medium requiring a largest effective diameter for reproduction, resides between (i) a position at which an optical axis meets said laser beam passing through a height corresponding to an effective diameter required for reproduction of said information recording media, and (ii) a position at which the optical axis meets said laser beam passing through an innermost of an area outside said outermost phase step, and wherein the edge angles of all the phase steps are obtuse angles more than 90 degrees.

2. An optical pickup according to claim 1, wherein
a width of a non-diffractive area which is outside said outermost phase step and within a second large effective diameter of said plurality of effective diameters is wider than distances between a plurality of phase steps included in said diffractive lens structure.

3. An optical pickup according to claim 1, wherein
said diffractive lens structure includes a plurality of phase steps which have a distance between them that decreases and then increases at higher heights from a vicinity of an optical axis.

4. An optical pickup according to claim 1, wherein
an rms value W of a wavefront aberration during reproducing at least one of information recording media meets, $0.05\lambda$ rms$<W<0.13\lambda$ rms.

5. An optical pickup according to claim 1, wherein
said diffractive lens structure is formed on a lens surface of said objective lens.

6. An optical pickup according to claim 1, wherein
said diffractive lens structure is formed on a surface of a lens different from said objective lens.

7. An optical pickup according to claim 1, wherein
said light source emits a laser beam with a wavelength at least in a vicinity of 407 nm.

8. An optical pickup according to claim 7, wherein
said light source further emits a laser beam with a wavelength in a vicinity of 650 nm.

9. An information reproducing apparatus for reproducing a plurality of information recording media to be reproduced by a plurality of laser beams with different wavelengths, comprising
an optical pickup according to claim 1.

10. An optical pickup according to claim 1, wherein a height from the optical axis when wave front aberration curve has the extreme, is located between the second large effective diameter of the plurality of effective diameters and the innermost in a non-diffractive area which is within the second large effective diameter.

11. An optical element for correcting a wavefront aberration generated during focusing a plurality of laser beams with different wavelengths through an objective lens on recording surfaces of plural types of information recording media, comprising, a diffractive lens structure including ring zone areas divided by a plurality of phase steps, wherein a diameter of an outermost phase step of said diffractive lens structure is smaller than a second largest effective diameter of effective diameters required for reproduction of said plural types of information recording media, wherein a focused point of a reproducing laser beam which passes through said diffractive lens structure during reproducing at least one of those of said plural types of information recording media that are other than an information recording medium requiring a largest effective diameter for reproduction, resides between (i) a position at which an optical axis meets said laser beam passing through a height corresponding to an effective diameter required for reproduction of said information recording media, and (ii) a position at which the optical axis meets said laser beam passing through an innermost of an area outside said outermost phase steps, and wherein the edge angles of all the phase steps are obtuse angles more than 90 degrees.

12. An optical element according to claim 11, wherein
a width of a non-diffractive area which is outside said outermost phase step and within a second large effective diameter of said plurality of effective diameters is wider than distances between a plurality of phase steps included in said diffractive lens structure.

13. An optical element according to claim 11, wherein
said diffractive lens structure includes a plurality of phase steps which have a distance between them that decreases and then increases at higher heights from a vicinity of an optical axis.

14. An optical element according to claim 11, wherein
an rms value W of a wavefront aberration during reproducing at least one of information recording media meets, $0.05\lambda$ rms$<W<0.13\lambda$ rms.

15. An optical element according to claim 11, wherein said optical element comprises an integrated objective lens element.

16. An optical element according to claim 11, wherein
said diffractive lens structure is formed on a plate lens substrate.

17. An optical element according to claim 11, wherein said optical element corrects said wavefront aberration with respect to a laser beam with a wavelength at least in a vicinity of 407 nm.

18. An optical element according to claim 17, wherein
said optical element further corrects said wavefront aberration with respect to a laser beam with a wavelength in a vicinity of 650 nm.

19. An optical element according to claim 11, wherein a height from the optical axis when wavefront aberration curve has the extreme, is located between the second large effective diameter of the plurality of effective diameters and the innermost in a non-diffractive area which is within the second large effective diameter.

* * * * *